US00RE39830E

(19) United States
(12) Reissued Patent
Balabanovic

(10) Patent Number: US RE39,830 E
(45) Date of Reissued Patent: Sep. 11, 2007

(54) METHOD FOR APPARATUS FOR RECORDING AND PLAYBACK OF MULTIDIMENSIONAL WALKTHROUGH NARRATIVES

(75) Inventor: Marko Balabanovic, London (GB)

(73) Assignee: Ricoh Co., Ltd., Tokyo (JP)

(21) Appl. No.: 10/988,446

(22) Filed: Nov. 12, 2004

Related U.S. Patent Documents

Reissue of:
(64) Patent No.: 6,480,191
Issued: Nov. 12, 2002
Appl. No.: 09/407,009
Filed: Sep. 28, 1999

(51) Int. Cl.
*G06T 15/00* (2006.01)

(52) U.S. Cl. ..... 345/419; 345/473; 345/629; 715/500; 715/723; 715/748; 715/835; 463/1; 463/9; 709/204; 709/217; 705/5

(58) Field of Classification Search ..... 463/9; 705/5; 709/204, 217; 707/500; 345/419, 473, 345/629; 715/748, 769, 835, 838
See application file for complete search history.

(56) References Cited

U.S. PATENT DOCUMENTS 5,679,075 A * 10/1997 Forrest et al.
5,782,692 A * 7/1998 Stelovsky
5,799,280 A 8/1998 Degen et al.
5,983,220 A * 11/1999 Schmitt
5,986,660 A * 11/1999 Sweatt, III
6,041,335 A 3/2000 Merritt et al.
6,084,590 A * 7/2000 Robotham et al.
6,119,147 A * 9/2000 Toomey et al.
6,154,771 A * 11/2000 Rangan et al.
6,333,753 B1 12/2001 Hinckley

OTHER PUBLICATIONS

M Crossley et al., "Three–dimensional Internet developments", BT Technol. J vol. 15 No. 2 Apr. 1997, Published 1997, pp. 179–193.*

* cited by examiner

*Primary Examiner*—Kimbinh T. Nguyen
(74) *Attorney, Agent, or Firm*—Blakely, Sokoloff, Taylor & Zafman LLP

(57) ABSTRACT

A method and apparatus for recording and playback of multidimensional walkthrough narratives. A three dimensional modeling language is used to automatically create a simple three-dimensional environment using pre-existing electronic documents. A first user, or author may navigate throughout the three-dimensional environment while at the same time recording the path taken and any accompanying audio. In one of two playback modes, a second user can be shown a "walkthrough" of the three-dimensional scene corresponding to the path taken by the author. In the other playback mode, a second user is free to navigate the three-dimensional world while the author's path is displayed.

218 Claims, 11 Drawing Sheets

```
<CHRONICLE SAVETIME= "927336993806" AUTHORID="marko">
<SUBCHRONICLE AUTHORID="marko" STARTTIME="927336940440">
<CLIP><AUDIOREFS LENGTH="3240">
<AUDIO SRC="http://Server/Clip1.au"/>
<CLIPREF TIME="1753" REF="http://Server/Doc1"/>
</AUDIOREFS></CLIP>
<CLIP><AUDIOREFS LENGTH="11600">
<AUDIO SRC= "http://Server/Clip2.au"/>
<CLIPREF TIME= "2293" POINTX= "250" POINTY= "750" REF= "http://
Server/Doc2"/>
<CLIPREF TIME= "6259" POINTX= "330" POINTY= "250" REF= "http://
Server/Doc3"/>
</AUDIOREFS></CLIP>
<CLIP><AUDIOREFS LENGTH= "1920">
<AUDIO SRC= "http://Server/Clip3.au"/>
</AUDIOREFS></CLIP>
</SUBCHRONICLE>
<SUBCHRONICLE AUTHORID= "marko" STARTTIME= "927336977200">
<CLIP><AUDIOREFS LENGTH= "6560">
<AUDIO SRC= "http://Server/Clip4.au"/>
<CLIPREF TIME= "4086" REF= "http://Server/Doc4"/>
</AUDIOREFS></CLIP>
</SUBCHRONICLE>
</CHRONICLE>
```

FIG. 3b

METHOD FOR APPARATUS FOR RECORDING AND PLAYBACK OF MULTIDIMENSIONAL WALKTHROUGH NARRATIVES

Matter enclosed in heavy brackets [ ] appears in the original patent but forms no part of this reissue specification; matter printed in italics indicates the additions made by reissue.

FIELD OF THE INVENTION

The invention relates to the field of authoring of electronic information; more specifically, this invention relates to a method and apparatus for recording and playback of multidimensional walkthrough narratives.

BACKGROUND OF THE INVENTION

It has been asserted that a large percentage of a typical person's day is spent communicating with others through various mechanisms including oral and written media. Further, there is often a tradeoff between rich, oral communication media and less rich, written communication media. While oral media enable negotiation, clarification, explanation and exchange of subjective views, written media enable the exchange of large amounts of accurate, objective or numeric data.

This dichotomous relationship between oral and written communication similarly exists within the electronic realm. Simple textual email messages, although easy to author, typically do not allow rich, expressive communication as may sometimes be required. On the other hand, tools for creating richer, more expressive messages, such as multimedia presentation software, are too complex and time consuming for casual or day-to-day use. Furthermore, multimedia presentation software typically is not designed to be used as an communication tool. Multimedia "documents" produced using this software tend to present information to an audience, rather than allow user interaction and self-guided learning.

Therefore, what is needed is a method for creating a simple and effective multimedia authoring tool that overcomes the limitations found within the prior art.

SUMMARY OF THE INVENTION

A method and apparatus for creating and/or playing back walthrough narratives is described. In one embodiment, the method includes generating a multidimensional representation of electronic documents within a three-dimensional environment, recording a narrative of the multidimensional representation, and storing the multidimensional representation and the narrative to allow playback in at least one of multiple modes.

BRIEF DESCRIPTION OF THE DRAWINGS

The invention is illustrated by way of example, and not by way of limitation in the figures of the accompanying drawings in which like reference numerals refer to similar elements.

FIG. 3B illustrates one embodiment of an XML representation for the multimedia chronicle shown in FIG. 3A.

DETAILED DESCRIPTION

Figure 1A:
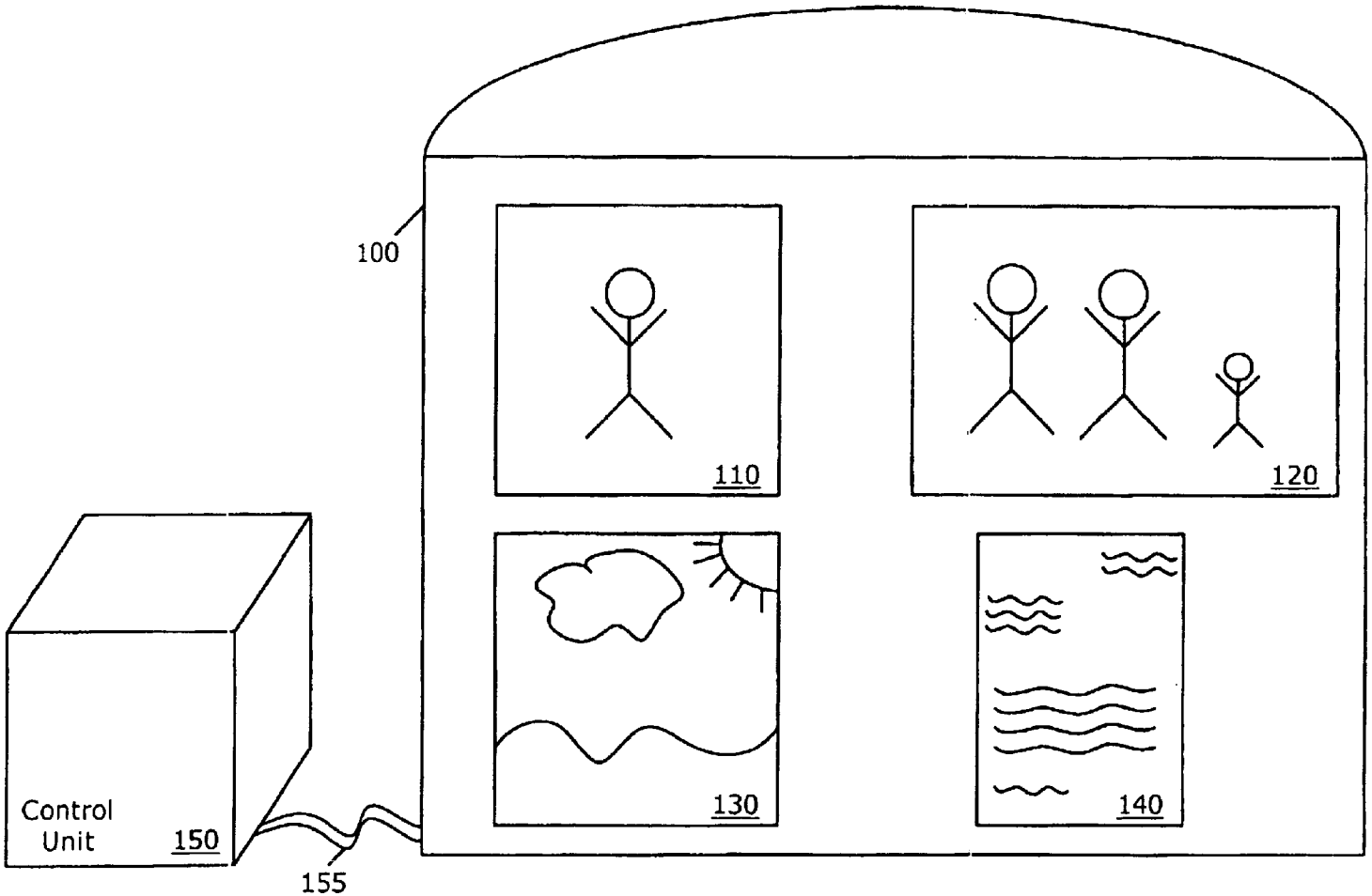
FIG. 1A illustrates an electronic display upon which is shown electronic documents are.

A method and apparatus for generating visual representations is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates an electronic display device upon which various electronic documents are displayed. Referring to FIG. 1A, display device 100 may comprise any device equipped to display electronic images and data as described herein. Display device 100 may be, for example, a cathode ray tube (CRT), liquid crystal display (LCD), or any other similarly equipped display device, screen, or monitor. In one embodiment, display device 100 is equipped with a touch screen in which a touch-sensitive, transparent panel covers the screen of display device 100. Additionally, display device 100 is shown coupled to control unit 150 by connector cable 155. Connecting cable 155 may be external or internal to display device 100.

Control unit 150 may comprise an arithmetic logic unit, a microprocessor, a general purpose computer, a personal digital assistant or some other information appliance equipped to provide electronic display signals to display device 100. In one embodiment, control unit 150 comprises a general purpose computer having a graphical user interface, which may be generated by, for example, WINDOWS® or JAVA® based operating systems. In one embodiment, electronic documents 110, 120, 130, and 140 are generated by one or more application programs executed by control unit 150 including, without limitation, word processing applications, electronic mail applications, spreadsheet applications, and web browser applications. In one embodiment, the operating system and/or one or more application programs executed by control unit 150 provide "drag-and-drop" functionality where each electronic document, such as electronic documents 110, 120, 130, and 140, may be encapsulated as a separate data object.

Referring still to FIG. 1A, connector cable 155 represents any connector cable known in the art to route display signals from a device such as control unit 150 to a display device such as display device 100. In an alternative embodiment, control unit 150 may be situated within display device 100 and the use of connector cable 155 may not be required or may be internal to display device 100.

Figure 1B:
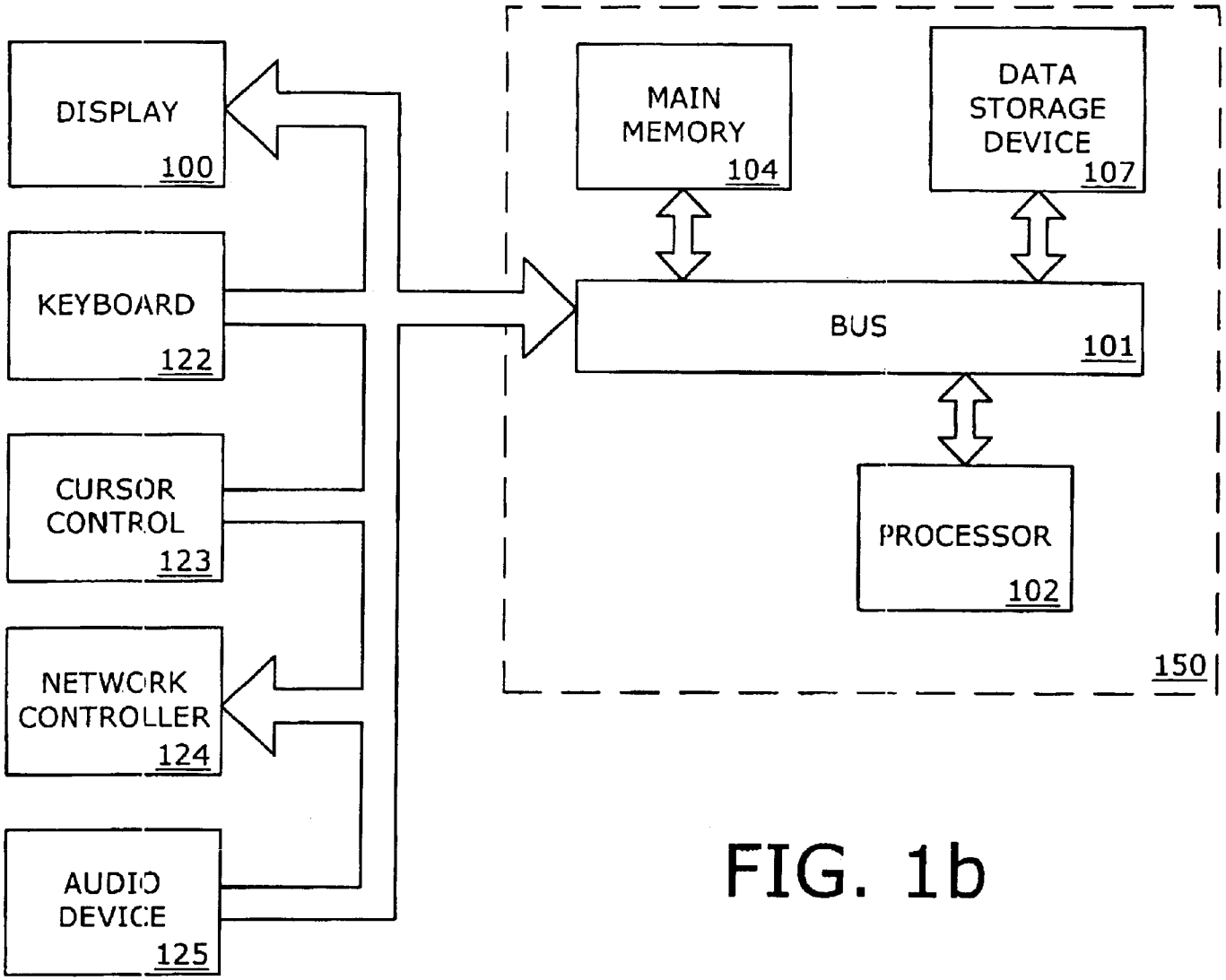
FIG. 1B is a block diagram illustrating one embodiment of a computer system.

FIG. 1B is a block diagram of one embodiment of a computer system. Referring to FIG. 1B, control unit 150 is shown including processor 102, main memory 104, and data storage device 107, all of which are communicatively coupled to system bus 101.

Processor 102 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1B, multiple processors may be included.

Main memory 104 may store instructions and/or data that may be executed by processor 102. The instructions and/or data may comprise code for performing any and/or all of the techniques described herein. Main memory 104 may be a dynamic random access memory (DRAM) device, a static random access memory (SRAM) device, or some other memory device known in the art.

Data storage device 107 stores data and instructions for processor 102 and may comprise one or more devices including a hard disk drive, a floppy disk drive, a CD-ROM device, a DVD-ROM device, a DVD-RAM device, a DVD-RW device, a flash memory device, or some other mass storage device known in the art.

System bus 101 represents a shared bus for communicating information and data throughout control unit 150. System bus 101 may represent one or more buses including an industry standard architecture (ISA) bus, a peripheral component interconnet (PCI) bus, a universal serial bus (USB), or some other bus known in the art to provide similar functionality.

Additional components coupled to control unit 150 through system bus 101 include display device 100, keyboard 122, cursor control device 123, network controller 124 and audio device 125. Display device 100 represents any device equipped to display electronic images and data as described herein. Display device 100 may be a cathode ray tube (CRT), liquid crystal display (LCD), or any other similarly equipped display device, screen, or monitor. Keyboard 122 represents an alphanumeric input device coupled to control unit 150 to communicate information and command selections to processor 102. Cursor control 123 represents a user input device equipped to communicate positional data as well as command selections to processor 102. Cursor control 123 may include a mouse, a trackball, a stylus, a pen, cursor direction keys, or other mechanism to cause movement of a cursor. Network controller 124 links control unit 150 to a network that may include multiple processing systems. The network of processing systems may comprise a local area network (LAN), a wide area network (WAN) (e.g., the Internet), and/or any other interconnected data path across which multiple devices may communicate.

Audio device 125 is coupled to system bus 101 and is equipped to receive audio input and transmit audio output. Audio input may be received through various devices including a microphone within audio device 125 and network controller 124. Similarly, audio output may originate from various devices including processor 102 and network controller 124. In one embodiment, audio device 125 is a general purpose, audio add-in/expansion card designed for use within a general purpose computer system. Optionally, audio device 125 may contain one or more analog-to-digital or digital-to-analog converters, and/or one or more digital signal processors to facilitate audio processing.

It should be apparent to one skilled in the art that control unit 150 may include more or less components than those shown in FIG. 2 without departing from the spirit and scope of the present invention. For example, control unit 150 may include additional memory, such as, for example, a first or second level cache, or one or more application specific integrated circuits (ASICs). Similarly, additional components may be coupled to control unit 150 including, for example, image scanning devices, digital still or video cameras, or other devices that may or may not be equipped to capture and/or download electronic data to control unit 150.

Audio-Narratives

In accordance with one embodiment, one can record a variable-length audio narration that may optionally describe one or more electronic documents or images displayed upon a display device. In one embodiment, by indicating a position on a display screen through clicking, pointing, or touching the display screen, audio recording is initiated and a dynamically adjustable audio gauge is displayed. The audio gauge increases in size in proportion to the amount of audio recorded while the audio gauge is active. Audio recording may cease when the audio level drops below a predetermined threshold or may cease in response to specific user input. In one embodiment, for each additional positional stimulus received, a new audio gauge is generated and the previous audio gauge ceases to be adjusted, thereby becoming inactive.

The term "positional stimulus," as referred to herein, represents an input which can simultaneously indicate an electronic location on the display screen with an instant in time tracked by the control unit. Various input sources may generate a positional stimulus including, without limitation, a computer mouse, a trackball, a stylus or pen, and cursor control keys. Similarly, a touch screen is capable of both generating and detecting a positional stimulus. In one embodiment, positional stimuli are detected by control unit 150, whereas in another embodiment, positional stimuli are detected by display device 100.

In an exemplary embodiment, once a positional stimulus occurs, such as a "click" of a mouse or a "touch" on a touch screen, an audio gauge is generated on display device 100 at the location indicated by the positional stimulus. At substantially the same time as the audio gauge is generated, control unit 150, or a similarly equipped device coupled to control unit 150, begins to record audio input. In one embodiment, the size of the audio gauge displayed is dynamically adjusted so as to proportionally indicate the amount of audio recorded by control unit 150, or the similarly equipped device coupled to control unit 150. Audio may be recorded by control unit 150 through audio device 125 or similar audio hardware (or software), and the audio may be stored within data storage device 107 or a similarly equipped audio storage device. In one embodiment, control unit 150 initiates audio recording in response to detecting a positional stimulus, whereas in an alternative embodiment, control unit 150 automatically initiates audio recording upon detecting audio input above a predetermined threshold level. In another embodiment, a set of on-screen or physical buttons are used to control recording. Buttons for audio control are well-known and include "Record", "Play", "Stop", "Pause", "Fast Forward", "Rewind". Similarly, audio recording may automatically be terminated upon the audio level dropping below a predetermined threshold or upon control unit 150 detecting a predetermined duration of silence where there is no audio input.

Figure 2A:
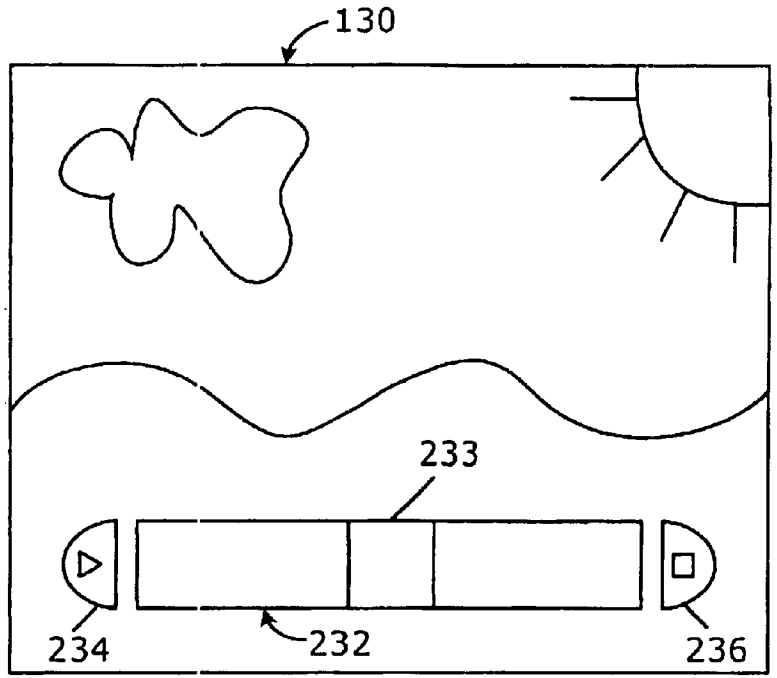
FIG. 2A illustrates an electronic document in the form of a digital photograph displayed with one embodiment of an associated audio gauge.

FIG. 2A illustrates an electronic document in the form of a digital photograph displayed with an associated audio gauge. Referring to FIG. 2A, electronic document 130 is shown on display device 100. In an alternative embodiment, electronic document 130 may appear as a reduced size "thumbnail" representation of a larger image or document.

In one embodiment, audio gauge 232 is displayed overlayed upon electronic document 130 and includes start indicator 234 and stop indicator 236. Start indicator 234 marks the location at which an initial positional stimulus for audio gauge 232 was detected and stop indicator 236 marks the location at which audio gauge 232 ceased while being dynamically adjusted. In one embodiment, audio gauges cease being dynamically adjusted as a result of audio input ceasing or falling below a minimum threshold level. Since, in FIG. 2A, the positional stimulus associated with audio gauge 232 is detected at a point located on electronic document 130 (indicated by start indicator 234), audio gauge 232 is subsequently generated on electronic document 130. In one embodiment, audio gauges are rendered semitransparently, so that electronic documents located underneath, such as electronic document 130, remain visible. Audio gauges may graphically display the recorded audio waveform or segments of speech and silence.

Audio recorded according to the methods described herein may be played back or replayed in any of a number of ways. In one embodiment, recorded audio is replayed when control unit 150 detects a positional stimulus indicating a location on, or substantially close to, the start indicator of the associated audio gauge. In another embodiment, recorded audio is replayed when control unit 150 detects a positional stimulus indicating a location on, or substantially close to, any part of the associated audio gauge or electronic document or when the user presses a button as described above.

Audio gauges may also include a replay progress indicator such as progress puck 233. In one embodiment, as recorded audio is replayed, progress puck 233 moves along audio gauge 232 so as to indicate both the amount of recorded audio replayed as well as the amount of recorded audio remaining to be replayed. In FIG. 2A, progress puck 233 indicates that approximately 50% of the recorded audio associated with audio gauge 232 has been replayed. In other embodiments, progress indicators may take other forms including various geometric shapes or variations in color that progress along audio gauge 232. In one embodiment, replay of the recorded audio continues while a positional stimulus is detected that indicates a location on or substantially close to stop indicator 236, or until all previously recorded audio associated with the audio gauge has been replayed. Audio gauges may optionally include a "pause" indicator that, when selected, temporarily suspends recording or playback, and a "resume" indicator that resumes recording or playback after being paused.

Figure 2B:
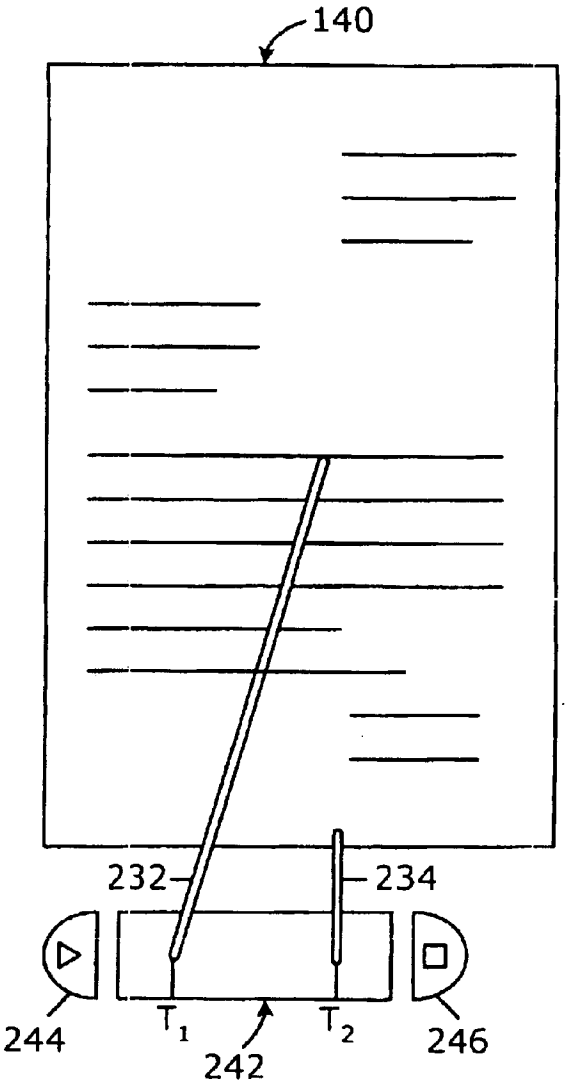
FIG. 2B illustrates one embodiment of an audio gauge that includes reference markers.

Reference markers may also be utilized to enhance understanding of recorded audio content. FIG. 2B illustrates an exemplary audio gauge including reference markers. Referring to FIG. 2B, audio gauge 242 includes start and stop indicators 244 and 246 and is displayed upon display device 100 at a location below electronic document 140. Note that audio gauge 242 may be overlayed on electronic document 140. Reference markers 232 and 234 graphically connect audio gauge 242 with electronic document 140. Reference markers 232 and 234 extend from time-dependent locations on audio gauge 242 to user-specified locations within electronic document 140. In one embodiment, reference markers 232 and 234 are rendered semi-transparently to allow the contents of electronic document 140 to be visible through reference markers 232 and 234.

In an exemplary embodiment, reference markers 232 and 234 are generated on display device 100 while audio is being recorded by control unit 150. Recall that according to one embodiment, audio is recorded and an audio gauge 242 generated in response to the system (either control unit 150 or display device 100) detecting a positional stimulus. As audio continues to be recorded, the size of the corresponding audio gauge 242 is proportionally adjusted so as to reflect the amount of audio recorded. In one embodiment, if the system detects an additional positional stimulus indicating a location on or substantially close to an electronic document while audio gauge 242 is being adjusted (e.g., audio is being recorded), the system generates a reference marker connecting the end-point of audio gauge 242 to that location indicated on the electronic document. In the case of audio gauge 242, reference marker 232 is initiated by a positional stimulus detected at time T1, whereas reference marker 234 is initiated by a positional stimulus detected at a later time T2. In one embodiment, during replay of the recorded audio, reference marker 232 is displayed upon display device 100 when the recorded audio reaches time T1 and reference marker 234 is displayed upon display device 100 when the recorded audio reaches time T2.

The location on an electronic document to which a reference marker is graphically connected may be represented by (x,y) coordinates in the case where an electronic document represents an image, or the location may be represented by a single coordinate in the case where an electronic document represents a linear document. Examples of linear documents may include a plain text document, a hypertext markup language (HTML) document, or some other markup language-based document including extensible markup language (XML) documents.

In one embodiment, if during audio recording the system detects an additional positional stimulus that is not located on or substantially close to an electronic document, control unit 150 generates an additional audio gauge rather than a reference marker. The additional audio gauge may be generated in a manner similar to the first audio gauge described above. In one embodiment, control unit 150 graphically connects multiple audio gauges in the order in which they were generated. Upon audio replay, control unit 150 may sequentially replay the recorded audio in the chronological order that the audio was recorded. In one embodiment, one or more progress indicators may be utilized to display the amount of audio played with respect to each audio gauge. In another embodiment, a single progress indicator that sequentially travels from one audio gauge to another corresponding to the order of audio replay may be used.

In one embodiment, objects such as audio gauges, reference markers, electronic document thumbnails and icons may be repositioned individually or as a group, anywhere on display device 100 using conventional "drag" operations.

In another embodiment, neither the audio gauges nor the reference markers are displayed as recording occurs. However, a datafile is created that includes locations of the referenced documents and timestamps for when the references occurred. Details on such a data file are described in more detail below.

In one embodiment, the user speaking is recorded along with their "deictic" gestures (e.g., references to objects). In one embodiment, an interface includes a number of objects are displayed on the screen. In such a case, recording begins either when the user presses a "record" button or when the system detects the start of speech through its microphone. Whenever a user touches an object's graphical representation on a touchscreen, a time-stamped event is recorded. Recording ends either when the user presses a "stop" button or when the system detects end of speech. When playing back this message, the system plays the audio, and at the appropriate times displays the referred-to objects.

In one embodiment, the system allows the user to record an audio narrative and make references to digital photographs uploaded from a camera simply by touching them on a touchscreen. The resulting presentation is stored using the multimedia description languages SMIL and RealPix, allowing for playback using the widely distributed RealPlayer. A simple extension allows the user to refer to points or regions within objects by monitoring the locations "touched" more precisely. On playback, such gestures can become highlighting strokes overlaid on images or documents.

Multimedia Chronicles

A multimedia chronicle is a particular type of audio narrative that includes a singular narration thread and one or more references to various types of electronic documents. Multiple sub-chronicles, each containing a singular narration thread, may be combined to form a larger multimedia chronicle. Within a multimedia chronicle it is possible for one or more persons to describe various types of electronic documents including, for example, but not limited to, a Web page with hyperlinks, a slide show containing audio narration, a text document containing text annotations, a scanned document image, a word processor document a presentation, etc. The references may refer to the contents of the entire electronic document or to a specific area within the electronic document. A linear ordering of sub-chronicles may also be specified allowing them to be played back in a default order.

Figure 3A:
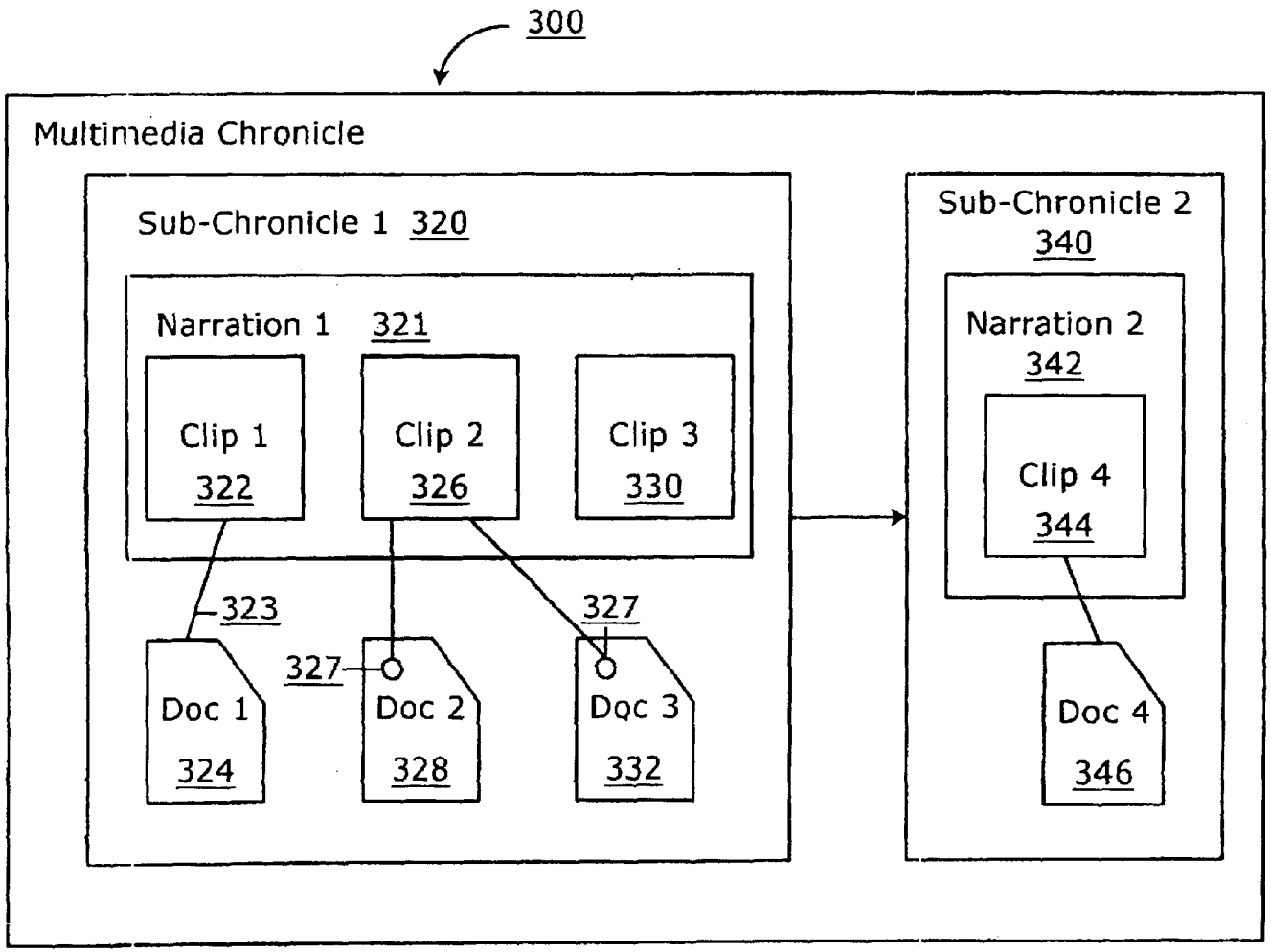
FIG. 3A is a block diagram illustrating one embodiment of an exemplary multimedia chronicle.

FIG. 3A illustrates an exemplary multimedia chronicle. Referring to FIG. 3A, multimedia chronicle 300 includes first sub-chronicle 320 and second sub-chronicle 340. First sub-chronicle 320 comprises narration thread 321, and second sub-chronicle 340 comprises narration thread 342. In one embodiment, a narration thread is a stream of recorded audio that follows a given theme or discussion topic. In FIG. 3A, narration thread 321 is segmented into an ordered list of three separate audio clips, and narration thread 342 of sub-chronicle 340 comprises only single audio clip 344.

Each narration thread may contain one or more references to various electronic documents. For example, narration thread 321 contains one reference to each of electronic documents 324, 328 and 332, for a total of three references. Narration thread 342, however, contains only a single reference to single electronic document 346. Each audio clip within a narration thread may contain any number of references to any number of electronic documents, or no references at all. For example, audio clip 322 contains a single reference to electronic document 324, audio clip 326 contains one reference to electronic document 328 and one reference to electronic document 332, and audio clip 330 does not contain any references.

Each reference may either indicate an entire electronic document, as shown by reference point 323, or optionally indicate a specific area within an electronic document, as shown by reference points 327. The coordinates representing such reference points may have different interpretations depending upon the type of electronic document they are referencing. For example, if the electronic document is an image, coordinates of the reference point may be absolute pixel coordinates. If the document is a web page, however, coordinates of the reference point may be a character position within an HTML file. In the case of a document stored as a series of page images, for instance, a scanned document, the reference point may be a page number plus (x,y) coordinates. Alternatively, if a document is represented by a layout language, such as Postscript or PDF (Portable Document Format), the coordinate can be a character position within the file. Then, upon rendering (during playback), this can be translated to a position on the screen.

The multimedia chronicle described above with respect to FIG. 3A may be represented by one or more markup languages including XML and HTML. FIG. 3B illustrates one embodiment of an XML representation for the multimedia chronicle shown in FIG. 3A.

Multimedia Messaging

Electronic mail (email) software usually provides an option by which an original email message may be included in a reply. Typically an email reply can be interspersed among the lines of the original message, or it can be appended or prepended to the original message as a single block. Multimedia chronicles may similarly be transferred over a network using a variety of readily available email applications known in the art.

Figure 4A:
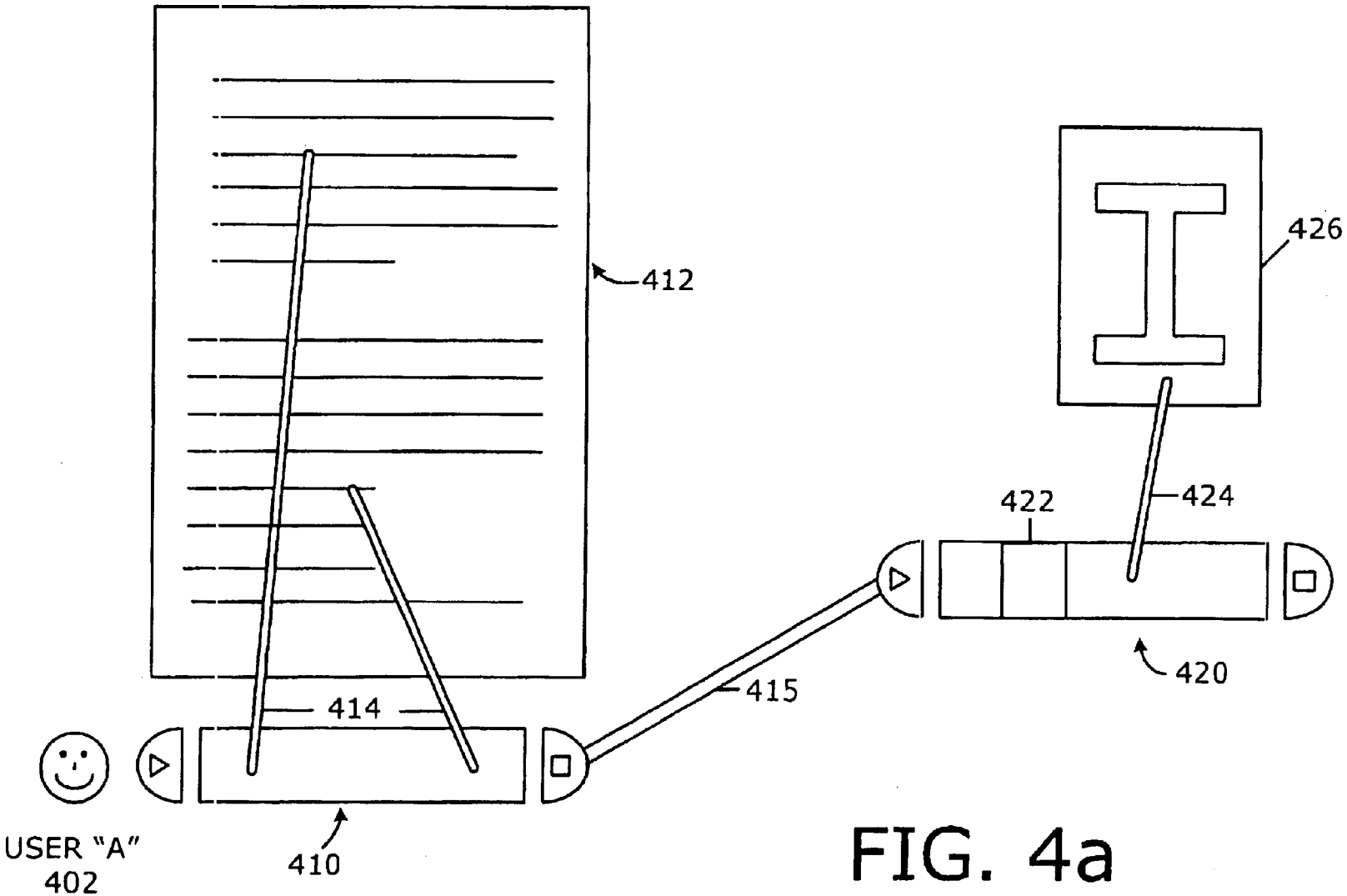
FIG. 4A illustrates another embodiment of a multimedia chronicle.

FIG. 4A illustrates one embodiment of a multimedia chronicle. Referring to FIG. 4A, electronic document 412 and icon 426 are shown along with two audio gauges 410 and 420 and various reference markers. Electronic document 412 represents a word processing document shown in a reduced "thumbnail" size, whereas icon 426 represents an iconized format of a similar word processing document in which the text of the document is not displayed. In one embodiment, the full text of the electronic document, represented by icon 426, may be viewed by "clicking" or selecting icon 426 with a cursor control input device such as a mouse. Audio gauge 410 is shown graphically connected to electronic document 412 by reference markers 414, whereas audio gauge 420 is shown graphically connected to icon 426 by reference marker 424.

Additionally, audio gauges 410 and 420 are shown connected together by connector 415 which indicates that the two audio clips represented by audio gauges 410 and 420 are chronologically adjacent (420 was recorded subsequent to 410). The connection may only indicate chronological ordering. However, a user can place gauges anywhere on the display. In one embodiment, audio clips recorded by the same user are considered to be related. In one embodiment the face image of the user who recorded the audio is displayed beside the corresponding audio gauge(s). In FIG. 4A, face image 402 represents user "A" who recorded the audio corresponding to audio gauges 410 and 420. In one embodiment, face images may be captured during recording by a video camera connected to the system, whereas in another embodiment, face images may be accessed from a database.

Once the multimedia chronicle illustrated by FIG. 4A is created, user "A" may send the multimedia chronicle to another user via electronic mail. In one embodiment, in order to send the multimedia chronicle to another user, an XML representation of the multimedia chronicle (such as that shown in FIG. 3B) is created. The XML representation references the various electronic documents and audio clips by way of URL addresses that point to their stored location (s). In one embodiment, the contents of a multimedia chronicle may be transferred to and stored on a designated web server, whereas in another embodiment, the contents may be stored locally on the user's personal computer. In an intranet environment, for example, contents of a multimedia chronicle may reside upon a user's personal computer and yet be accessed by others through a web interface. Once an XML representation of the multimedia chronicle is created, a unique URL pointing to the XML representation is subsequently emailed to another user, say user "B".

Upon receipt of the email containing the XML URL, user "B" may have several viewing options. In one embodiment, upon accessing the URL containing the XML representation, the XML representation is parsed to create and play the message if user "B" has an appropriate application to view the XML representation. In another embodiment, where user "B" does not have an appropriate application to view the XML representation, the message may alternatively be displayed as a standard HTML-based web page. That is, the XML representation containing individual URLs pointing to one or more electronic documents and audio clips is displayed as a list of individual hyperlinks rather than a chronicle. In yet another embodiment, the message may be translated into a synchronized multimedia integration language (SMIL) formatted file as specified by the World-Wide Web (WWW) consortium. Using a "viewer" such as RealPlayer G2 from Real Networks, Inc., user "B" may view the SMIL message as a slideshow in which the audio clips and corresponding electronic documents, and references are simultaneously presented in an order, such as the order in which they were recorded.

Access to the received multimedia chronicle message may optionally be limited by access control functions. In one embodiment, a user may only retrieve the message if he or she is the sender or named recipient. In another embodiment, users may be required to authenticate themselves with, for example, a user name and/or password prior to accessing the message.

Figure 4B:
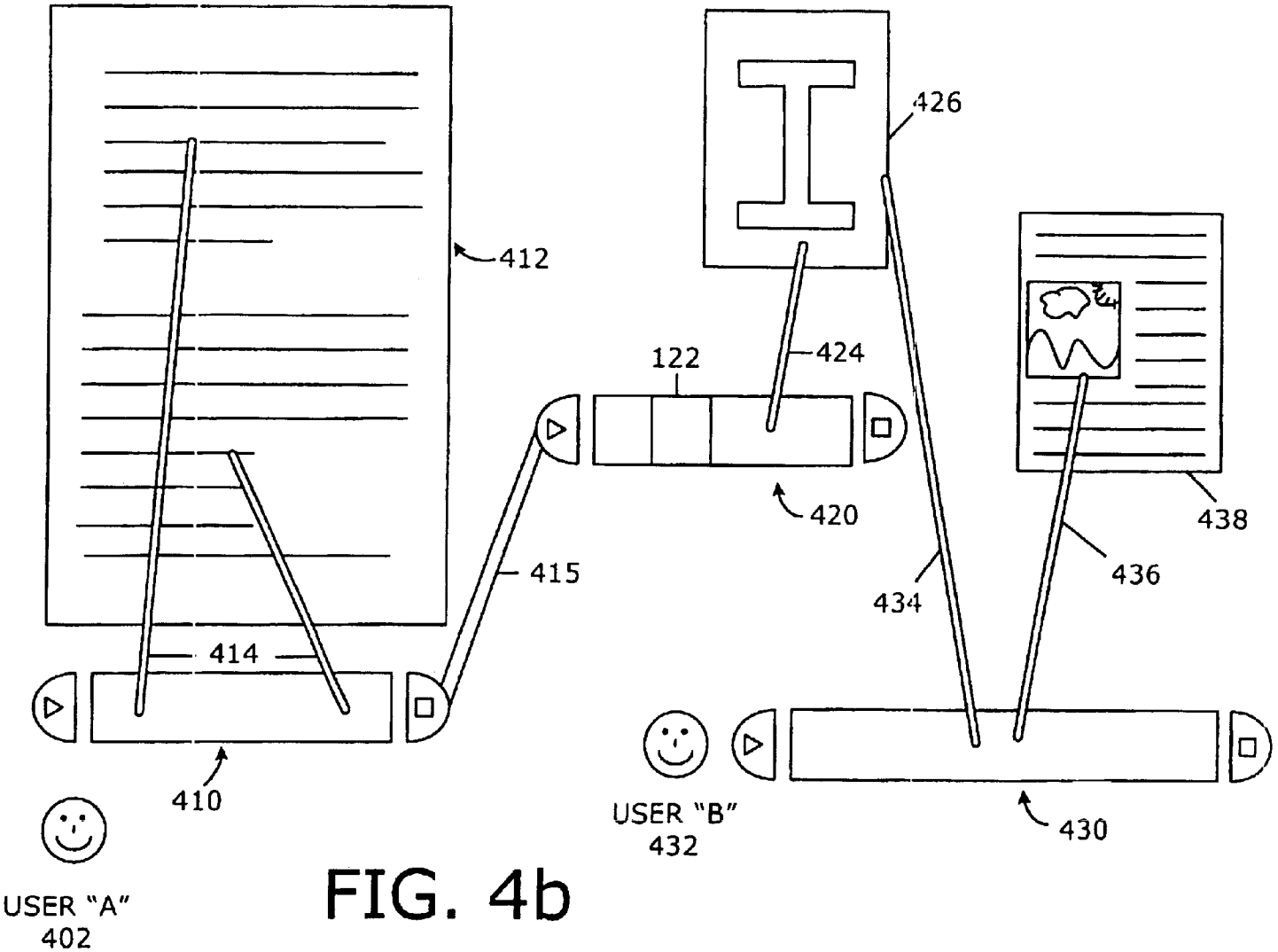
FIG. 4B illustrates one embodiment of a reply to an electronic mail message containing the multimedia chronicle shown in FIG. 4A.

Once user "B" receives the message, user "B" may reply by adding additional electronic documents and audio clips (represented by audio gauges). FIG. 4B illustrates one embodiment of a reply to an electronic mail message containing the multimedia chronicle shown in FIG. 4A. In addition to the items shown in FIG. 4A. FIG. 4B additionally includes a third audio gauge 430 containing reference markers 434 and 436. Audio gauge 430 represents an audio clip that was added by user "B" to the original message shown in FIG. 4A. In one embodiment audio gauge 430, created by user "B", is displayed in a different color than audio gauges 410 and 420, created by user "A". Reference marker 436 graphically connects audio gauge 430 with newly added electronic document 438, whereas reference marker 434 graphically connects audio gauge 430 with previously displayed icon 426. User "B" can position gauge anywhere on screen, but lines shown connecting elements on the display indicate chronological ordering.

Once user "B" enters a response to the message or multimedia chronicle received from user "A", user "B" may send the replay back to user "A" or to some other user or group of users. Assuming the replay is sent back to user "A", in one embodiment, user "A" first hears the additions made to user "A's" message by user "B". That is, upon receipt, user "A" hears the recorded audio represented by audio gauge 430.

Figure 4C:
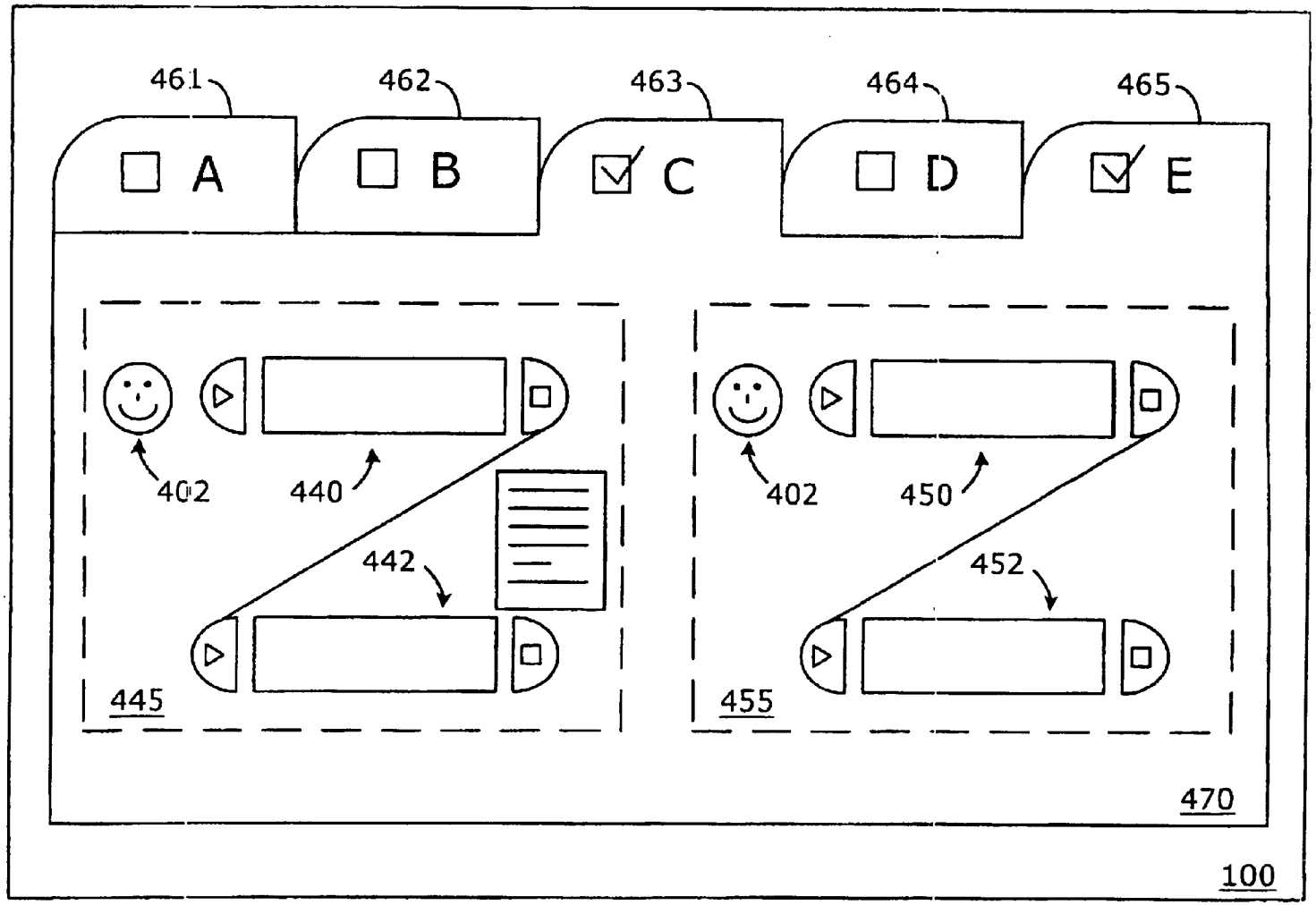
FIG. 4C illustrates one embodiment of a multimedia chronicle messaging interface that allows segments of the multimedia chronicle to be selectively viewed.

In one embodiment, a multimedia chronicle message may be displayed with separate user's additions or replies being selectively viewable. FIG. 4C illustrates one embodiment of a multimedia chronicle messaging interface that allows segments of the multimedia chronicle to be selectively viewed. Referring to FIG. 4C, messaging interface 465 is displayed upon display device 100. Messaging interface 470 includes audio gauges 440, 442, 450, and 452, faces 402, and tabs 460-465. Audio gauges 440 and 442 represent audio previously recorded by end user "A" (face 402), and audio gauges 450 and 452 represent audio currently being composed by end user "A". In one embodiment, each of tabs 460-465 is individually selectable and each may represent one segment of an ongoing conversation between user "A" and another user, such as user "B". For example, when selected, tab 461 displays an original message from user "A" to user "B". Tab 462 on the other hand displays user "B's" reply to user "A's" original message when selected. Likewise, when selected, tab 463 displays user "A's" reply (shown by bounding box 445) to user "B's" reply. In one embodiment, any number of past messages or replies may be selectively viewed while a new message or replay is being composed. For example, user "A's" reply (associated with tab 463 and shown by bounding box 445) is concurrently displayed with a message that user "A" is in the process of composing (associated with tab 465 and shown by bounding box 455). Once user "A" completes the message currently being composed, user "A" electronically mails the message in the manner described above. Tabs 460-465 may be labeled with the time of creation of the corresponding messages, as well as the names of the originators of the messages.

Three-Dimensional Walkthroughs

A method and apparatus for recording and playback of multidimensional walkthrough narratives is disclosed. A three dimensional modeling language is used to automatically create a three-dimensional environment using pre-existing electronic documents. Thus, the objects are 3D objects. In one embodiment, they are shown on a 2D display such as display device 100. In another embodiment, a 3D display (e.g., head-mounted glasses) can be used.

A first user, or author, may navigate throughout the three-dimensional environment while simultaneously recording the path taken and any accompanying audio input. In one of two playback modes, a second user can be shown a "walkthrough" of the three-dimensional scene corresponding to the path taken by the author. In the other playback mode, a second user is free to navigate the three-dimensional world while the author's path is displayed.

Generation

Figure 5:
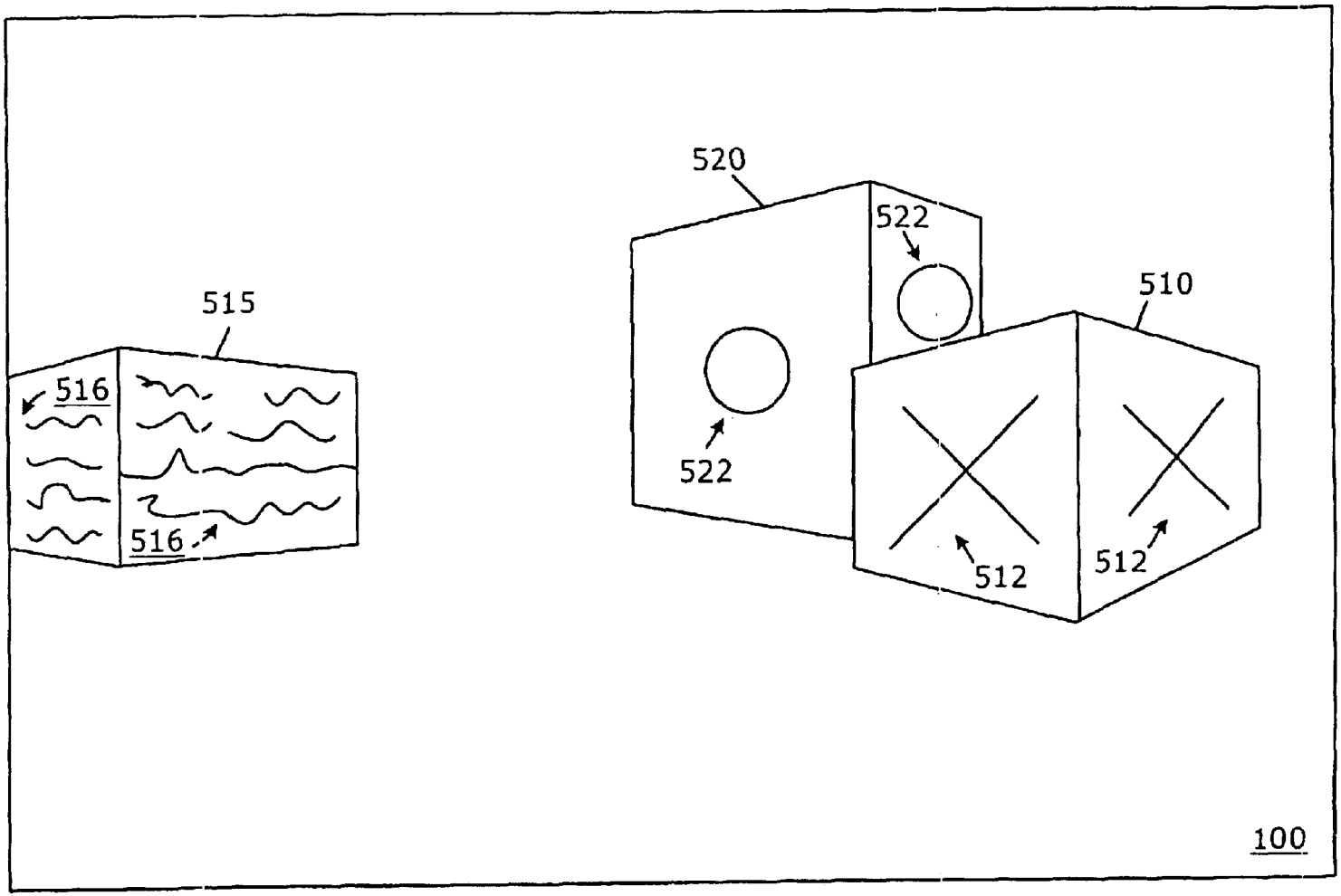
FIG. 5 illustrates one embodiment of a three-dimensional environment.

FIG. 5 illustrates one embodiment of a three-dimensional environment. Referring to FIG. 5, display device 100 is shown displaying a three-dimensional environment or world containing cubes 510, 515 and 520. In one embodiment, the three-dimensional environment is empty except for cubes 510, 515 and 520. In another embodiment, the three-dimensional environment may contain additional aesthetic or substantive features as may be desired.

Cubes 510, 515 and 520 are depicted in FIG. 5 as being three-dimensional and set within the three-dimensional world. In other embodiments, cubes 510, 515 and 520 may be replaced by other figures of varying shape. In one embodiment, for example, the cubes may be replaced by three-dimensional spheres, whereas in another embodiment, the cubes may be replaced by three-dimensional cylinders or rectangular prisms. Figures of varying size and shape may be used without departing from the spirit and scope of the invention.

FIG. 5 additionally shows electronic documents 512, 516 and 522 displayed upon cubes 510, 515 and 520 respectively. In a three-dimensional environment, electronic documents 512, 516 and 522 appear as being superimposed upon cubes 510, 515 and 520. In one embodiment, electronic documents 512 and 522 represent digital photographs, whereas electronic document 516 represents a word processing document. Additional forms of electronic documents may include without limitation, digitized audio and video, electronic spreadsheets, electronic databases, hypertext markup language and web documents, and electronic mail. Electronic documents 512, 516 and 522 may represent similar types of content and media not described herein.

In one embodiment, a two-dimensional reduced-size "thumbnail" image is created and superimposed upon a three-dimensionally rendered figure such as cubes 510, 515 and 520. In such a manner, a two-dimensional image can be converted into a three-dimensional representation of that image. In one embodiment, cubes 510, 515 and 520 are defined through extended markup language (XML). In another embodiment, a three-dimensional modeling language such as VRML, 3DML, and X3D may be used.

As each three-dimensional figure is generated, it is displayed within the three-dimensional environment. In one embodiment, each three-dimensional figure is randomly placed or displayed within the three-dimensional environment as it is generated. In another embodiment, each three-dimensional figure is displayed with respect to other preexisting three-dimensional figures according to a placement scheme. In one embodiment, placement schemes are based upon characteristics of the electronic documents contained within the three-dimensional figures. Examples of placement schemes include, without limitation, time of creation, content, and media type. In yet another embodiment, the three-dimensional figures are displayed at a pre-determined fixed distance from one another. By displaying the three-dimensional figures according to various placement schemes, it is possible for an author to group or cluster certain types of information together to help guide user understanding. In one embodiment, the user, or one who navigates the three-dimensional environment after creation, is able to rearrange the three-dimensional figures according to their own organizational preference.

Recording

Once the three-dimensional environment is created, it may be navigated by a user. In one embodiment, navigation is possible through the use of a readily available "player" application including a virtual reality modeling language (VRML) viewer such as Cosmo Player available from Silicon Graphics, Inc., of Mountain View, Calif., or a three dimensional modeling language (3DML) viewer such as Flatland Rover available from Flatland Online Inc., of San Francisco, Calif. In one embodiment, a special class of user, called an author, is able to navigate through the three-dimensional environment while the author's virtual movements are recorded. The term "recording" as used herein is meant to describe the process of retaining navigational and audio input as generated by a user with respect to the three-dimensional environment.

In an exemplary embodiment, an author navigates through a three-dimensional environment while a processing device, such as processor 102, causes the author's movements to be recorded. Any audio narrated by the author while navigating is also recorded, thus creating a walkthrough. In one embodiment, as the audio is recorded, it is segmented so as to divide the audio into multiple audio clips of varying duration according to a segmenting scheme. The audio may be recorded as described above. Thus, in one embodiment, a 2D multimedia chronicle is created and viewed as a 3D walkthrough, and vice-versa. Similarly, in another embodiment, video content may be recorded and segmented in lieu of audio. As the author navigates toward a three-dimensional figure, the electronic document superimposed upon the figure appears larger to the author. By approaching the figure, the author may take a closer look at the figure or electronic document contained thereon. If so equipped, the player application may also provide the author the opportunity to view the electronic document in a separate, full-screen display, in another part of the display, or in a dedicated portion of the display overlaying the walkthrough.

Figure 6:
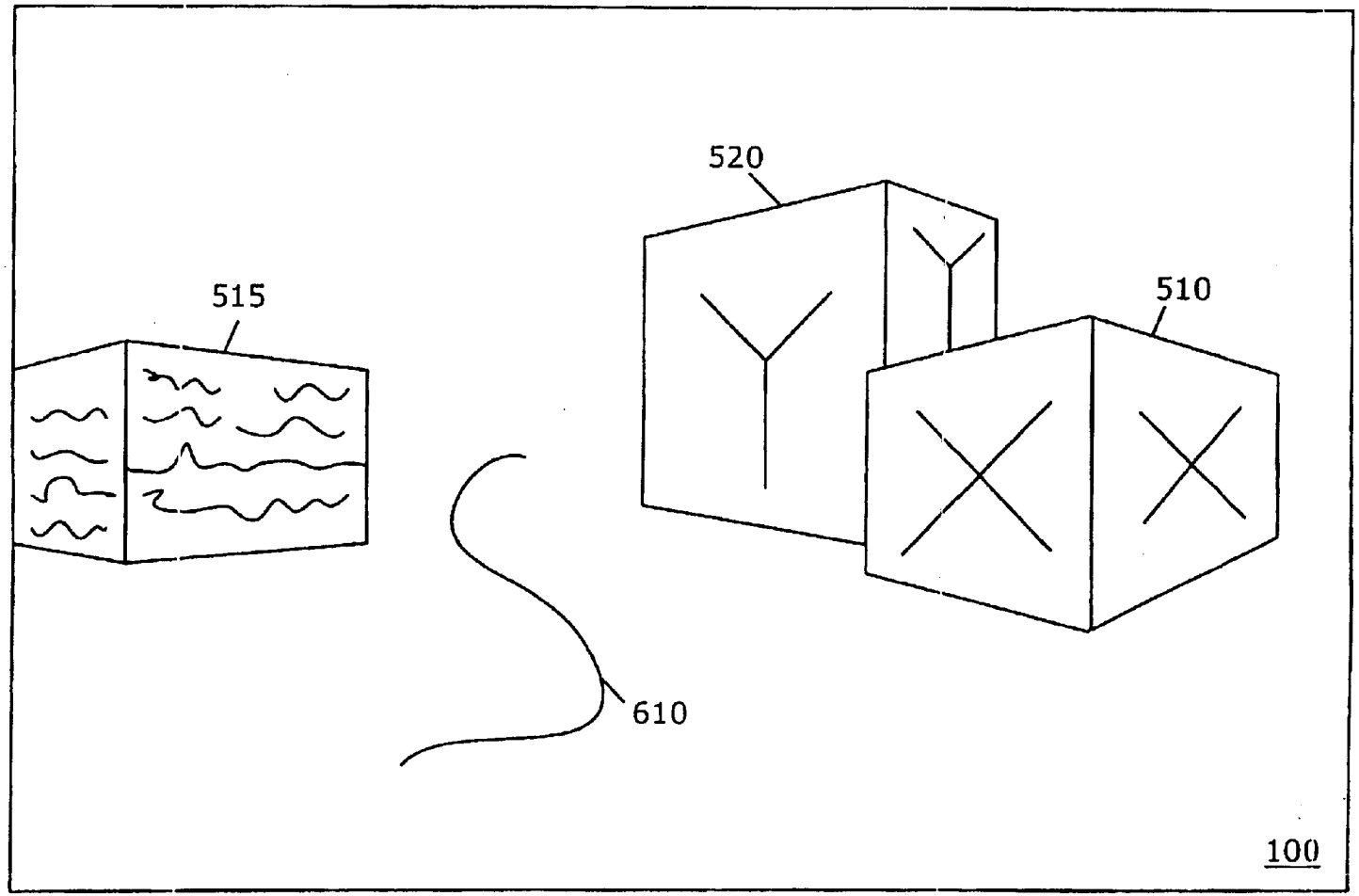
FIG. 6 illustrates one embodiment of a three-dimensional environment showing a path.

FIG. 6 illustrates a three-dimensional environment showing a recorded path according to one embodiment of the present invention. Referring to FIG. 6, display device 100 is shown displaying a three-dimensional environment containing three-dimensional cubes 510, 515 and 520, and path 610. Path 610 represents a path through which an author has navigated. Path 610 is shown as a line, but in other embodiments may take the form of various other shapes. In one embodiment, path 610 is displayed in a single color, while in other embodiments, path 610 may be displayed in multiple colors, or may appear semi-transparent.

Figure 7:
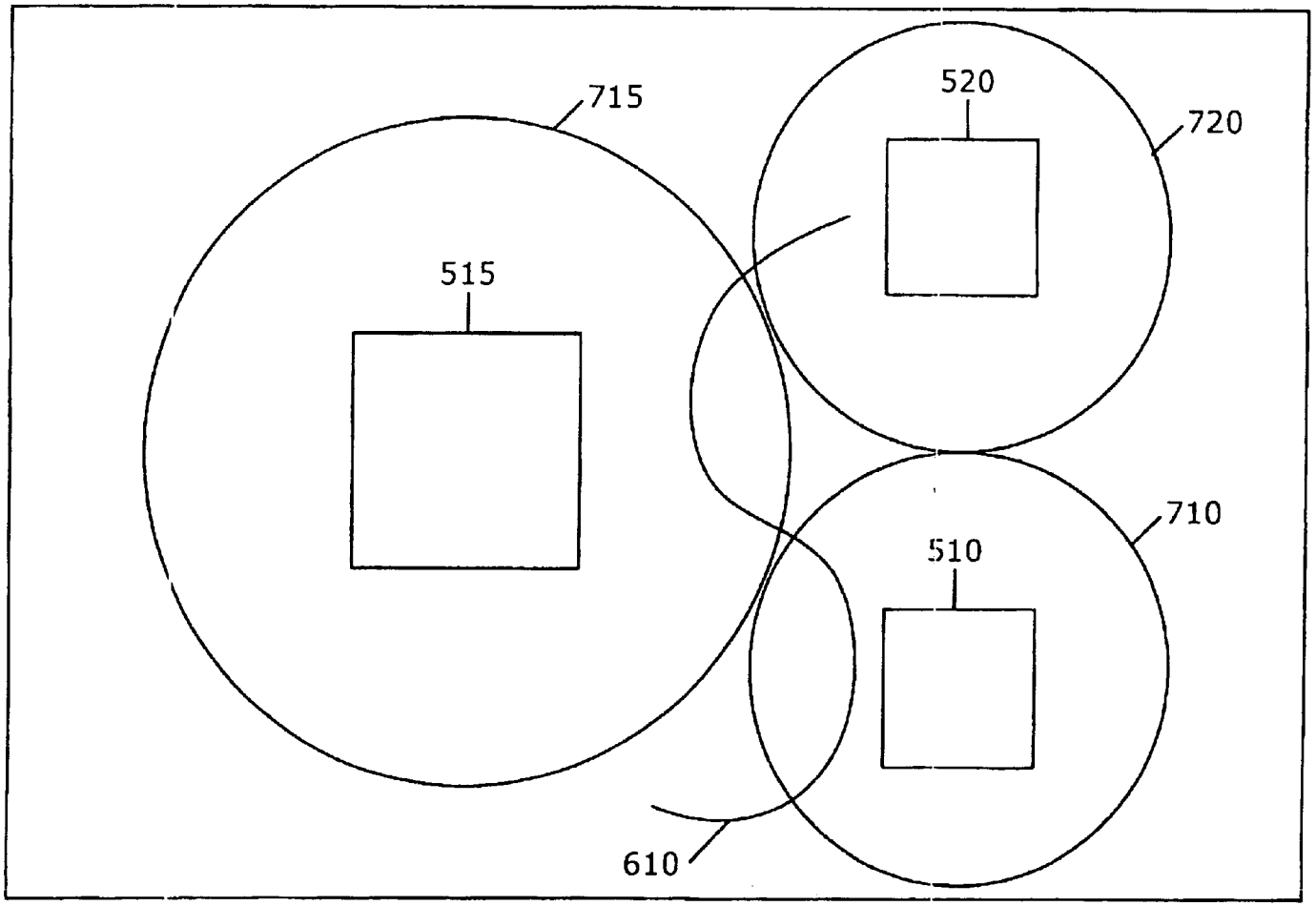
FIG. 7 illustrates a two-dimensional top view of the three-dimensional environment of FIG. 6.

FIG. 7 illustrates one embodiment of a two-dimensional top view of the three-dimensional environment shown in FIG. 6. Referring to FIG. 7, three-dimensional cubes 510, 515 and 520 are shown within proximity indicators 710, 715 and 720 respectively. In one embodiment, each of proximity indicators 710, 715 and 720 represent a bounded area that is associated with a particular media clip or segment. In one embodiment, the media clip contains audio content, whereas in another embodiment, the media chip contains video content.

In one embodiment, each proximity indicator is associated with an audio or a video segment that presumably relates to the three-dimensional figure bounded by the proximity indicator. In one embodiment, multiple three-dimensional figures may exist within a single proximity indicator, and in another embodiment, multiple proximity indicators may bound a single three-dimensional figure.

Playback

A user of the three-dimensional multimedia narrative described herein can choose whether to pursue playback of the recorded three-dimensional walkthrough in passive or active modes.

According to one embodiment, in a passive mode, the playback is movie-like in that the user is shown a three-dimensional walkthrough corresponding to the path taken by the author when the walkthrough was recorded. In one embodiment, audio narration that was recorded by the author is also played while in a passive mode. As documents are passed in a passive mode, the viewing user can also view the source of the documents in a separate window or viewing application.

In an active playback mode, the user is free to navigate the three-dimensional environment without being limited by the author's previously taken path. According to one embodiment of the present invention, while in active mode, the author's path remains visible as the user navigates through the three-dimensional environment. In yet another embodiment, segmented audio recorded by the author is played as the user approaches a related three-dimensional figure. Referring once again to FIGS. 6 and 7, as a user navigates along the author's path 610 and approaches cube 510, the user hears an audio segment recorded by the author while the author was within proximity indicator 710. In one embodiment, the audio would not be played until the user navigated to within the area bounded by proximity indicator 710. In another embodiment, the loudness of the audio may increase as the user approaches cube 510. Additionally, stereo effects may be used to locate audio within three-dimensional space corresponding to the position of the cube in the virtual three-dimensional environment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

I claim:

1. A method comprising:

generating a multidimensional representation of a plurality of electronic documents within a three-dimensional environment;

recording a narrative of the multidimensional representation; and storing the multidimensional representation and the narrative to allow playback in at least one of a plurality of modes.

2. The method of claim 1, wherein generating a multidimensional representation of a plurality of electronic documents comprises:

generating a first three-dimensional figure upon which a first of the plurality of electronic documents is superimposed; and displaying the three-dimensional figure within the three-dimensional environment.

3. The method of claim 2, further comprising:

generating a second three-dimensional figure upon which a second of the plurality of electronic documents is superimposed; and displaying the second three-dimensional figure within the three-dimensional environment.

4. The method of claim 3, wherein the first and second three-dimensional figures are displayed within the three-dimensional environment in an order representing their respective times of creation.

5. The method of claim 3, wherein the first and second three-dimensional figures are displayed within the three-dimensional environment at a fixed distance from each other.

6. The method of claim 3, further comprising:

generating a third three-dimensional figure upon which a third of the plurality of electronic documents is superimposed; and displaying the third three-dimensional figure within the three-dimensional environment.

7. The method of claim 6, wherein the third three-dimensional figure is displayed proximately to the first three-dimensional figure if the first three-dimensional figure and the third three-dimensional figure have electronic documents containing similar content displayed thereon, and the third three-dimensional figure is displayed proximately to the second three-dimensional figure if the second and third three-dimensional figures have electronic documents containing similar content displayed thereon.

8. The method of claim 6, wherein the third three-dimensional figure is displayed proximate the first three-dimensional figure if the first and third three-dimensional figures have electronic documents of a similar media type displayed thereon, and the third three-dimensional figure is displayed proximate the second three-dimensional figure if the second and third three-dimensional figures have electronic documents of a similar media type displayed thereon.

9. The method of claim 2, wherein generating a three-dimensional figure includes:

representing the first of a plurality of electronic documents as a two-dimensional thumbnail image, and utilizing a modeling language to convert the two-dimensional thumbnail image into the three-dimensional figure.

10. The method of claim 9, wherein the modeling language utilized is at least one of VRML and 3DML and X3d.

11. The method of claim 2, wherein the first three-dimensional figure is a cube having six sides.

12. The method of claim 1, wherein recording a narrative of the multidimensional representation further comprises:

recording movements and audio of an author as the author navigates through the three-dimensional environment.

13. The method of claim 12, wherein the recorded movements of the author are displayed in the three-dimensional environment so as to visually indicate a path taken by the author.

14. The method of claim 13, wherein the plurality of playback modes includes:

a passive mode, wherein navigation by a user through the three-dimensional environment is restricted to the path taken by the author; and an active mode, wherein the user is able to freely navigate through the three-dimensional environment.

15. The method of claim 12, wherein the recorded audio of the author is segmented into a plurality of audio segments and each of the plurality of audio segments is correlated to one of the plurality of electronic documents that is nearest the location of the author at a moment in time when the audio was recorded.

16. A method of representing a multidimensional electronic document comprising:

generating a plurality of three-dimensional figures;

superimposing upon the three-dimensional figures a plurality of electronic documents;

generating a three-dimensional environment within which the plurality of three-dimensional figures are to be displayed;

displaying within the three-dimensional environment, the plurality of three-dimensional figures according to a placement scheme; and playing a previously recorded narrative of the three-dimensional figures, wherein playback can occur in at least one of a plurality of modes.

17. The method of claim 16, wherein the first three-dimensional figure approximates the shape of at least one of a cube, a sphere, a cylinder, and a rectangular prism.

18. The method of claim 16, wherein a placement scheme orders a first three-dimensional figure and corresponding electronic document and a second three-dimensional figure and corresponding electronic document according to content.

19. The method of claim 16, wherein a placement scheme orders a first three-dimensional figure and corresponding electronic document and a second three-dimensional figure and corresponding electronic document according to media type.

20. The method of claim 16, wherein a placement scheme orders a first three-dimensional figure and corresponding electronic document and a second three-dimensional figure and corresponding electronic document according to time of creation.

21. The method of claim 16, wherein a placement scheme places a first three-dimensional figure at a predetermined distance from a second three-dimensional figure.

22. The method of claim 16, wherein the three-dimensional environment is generated using a modeling language including at least one of VRML and 3DML and X3D.

23. An article of manufacture comprising a computer-readable medium having machine readable instructions stored thereon, wherein when the instructions are executed by a processor, the instructions cause the processor to:

generate a multidimensional representation of a plurality of electronic documents within a three-dimensional environment;

record a narrative of the multidimensional representation; and store the multidimensional representation and the narrative to allow a playback of a previously recorded narrative of the multidimensional representation, wherein the playback can occur in at least one of a plurality of modes.

24. The article of claim 23 wherein the instructions that cause the processor to generate the multidimensional representation of the plurality of electronic documents comprises instructions that, when executed by the processor, cause the processor to:

generate a first three-dimensional figure upon which a first of the plurality of electronic documents is superimposed; and display the three-dimensional figure within the three-dimensional environment.

25. The article of claim 24 further comprising instructions that, when executed by the processor, cause the processor to:

generate a second three-dimensional figure upon which a second of the plurality of electronic documents is superimposed; and display the second three-dimensional figure within the three-dimensional environment.

26. The article of claim 25 wherein the first and second three-dimensional figures are displayed within the three-dimensional environment in an order representing their respective times of creation.

27. The article of claim 25 wherein the first and second three-dimensional figures are displayed within the three-dimensional environment at a fixed distance from each other.

28. The article of claim 25 further comprising instructions that, when executed by the processor, cause the processor to:

generate a third three-dimensional figure upon which a third of the plurality of electronic documents is superimposed; and display the third three-dimensional figure within the three-dimensional environment.

29. The article of claim 28 wherein the third three-dimensional figure is displayed proximately to the first three-dimensional figure if the first three-dimensional figure and the third three-dimensional figure have electronic documents containing similar content displayed thereon, and the third three-dimensional figure is displayed proximately to the second three-dimensional figure if the second and third three-dimensional figures have electronic documents containing similar content displayed thereon.

30. The article of claim 28 wherein the third three-dimensional figure is displayed proximately to the first three-dimensional figure if the first three-dimensional figure and the third three-dimensional figure have electronic documents of similar media type displayed thereon, and the third three-dimensional figure is displayed proximately to the second three-dimensional figure if the second and third three-dimensional figures have electronic documents of similar media type displayed thereon.

31. The article of claim 24 wherein the instructions that cause the processor to generate the three-dimensional figure comprises instructions that, when executed by the processor, cause the processor to:

represent the first plurality of electronic documents as a two-dimensional thumbnail image; and utilize a modeling language to convert the two-dimensional thumbnail image in the three-dimensional figure.

32. The article of claim 31 wherein the modeling language utilized comprises at least one of VRML and 3DML and X3d.

33. The article of claim 24 wherein the first three-dimensional figure is a cube having six sides.

34. The article of claim 23 wherein the previously recorded narrative of the multidimensional representation comprises recorded movements and audio of an author as the author navigates through the three-dimensional environment.

35. The article of claim 34 wherein the recorded movements of the author are displayed in the three-dimensional environment so as to visually indicate a path taken by the author.

36. The article of claim 35 wherein the plurality of playback modes includes:

a passive mode, wherein navigation by a user through a three-dimensional environment is restricted to the path taken by the author; and an active mode, wherein the use is able to freely navigate through the three-dimensional environment.

37. The article of claim 34 wherein the recorded audio of the author is segmented into a plurality of audio segments and each of the plurality of audio segments is correlated to one of the plurality of electronic documents that is nearest the location of the author at the moment in time when the audio was recorded.

38. An article of manufacture comprising a computer-readable medium having machine readable instructions stored thereon, wherein when the instructions are executed by a processor, the instructions cause the processor to:

generate a plurality of three-dimensional figures;

superimpose upon the three-dimensional figures a plurality of electronic documents;

generate a three-dimensional environment within which the plurality of three-dimensional figures are to be displayed;

display within the three-dimensional environment, the plurality of three-dimensional figures according to a placement scheme; and play a previously recorded narrative of the three-dimensional figures, wherein playback can occur in at least one or a plurality of modes.

39. The article of claim 38 wherein the first three-dimensional figure approximates the shape of at least one of a cube, a sphere, a cylinder, and a rectangular prism.

40. The article of claim 38 wherein a placement scheme orders a first three-dimensional figure and corresponding electronic document and a second three-dimensional figure and corresponding electronic document according to content.

41. The article of claim 38 wherein a placement scheme orders a first three-dimensional figure and corresponding electronic document and a second three-dimensional figure and corresponding electronic document according to media type.

42. The article of claim 38 wherein a placement scheme orders a first three-dimensional figure and corresponding electronic document and a second three-dimensional figure and corresponding electronic document according to time of creation.

43. The article of claim 38 wherein a placement scheme places a first three-dimensional figure at a predetermined distance from a second three-dimensional figure.

44. The article of claim 38 wherein the three-dimensional environment is generated using a modeling language including at least one of VMRL and 3DML and X3d.

*45. A method, comprising:*

*generating a multidimensional representation of a plurality of electronic documents in a three-dimensional (3-D) environment;*

*recording a multimedia representation in which the electronic documents are presented according to a predetermined placement scheme within the 3-D environment; and*

*storing the multimedia representation for playback according to the predetermined placement scheme within the 3-D environment.*

*46. The method of claim 45, wherein generating a multidimensional representation of a plurality of electronic documents comprises:*

*generating a first 3-D figure upon which a first of the plurality of electronic documents is superimposed; and*

*displaying the first 3-D figure within the 3-D environment.*

*47. The method of claim 46, further comprising:*

*generating a second 3-D figure upon which a second of the plurality of electronic documents is superimposed; and*

*displaying the second 3-D figure within the 3-D environment.*

*48. The method of claim 47, wherein the first and second 3-D figures are displayed within the 3-D environment in an order representing their respective times of creation.*

*49. The method of claim 47, wherein the first and second 3-D figures are displayed within the 3-D environment at a predetermined distance from each other.*

*50. The method of claim 47, further comprising:*

*generating a third 3-D figure upon which a third of the plurality of electronic documents is superimposed; and*

*displaying the third 3-D figure within the 3-D environment.*

*51. The method of claim 50, wherein the third 3-D figure is displayed proximately to the first 3-D figure if the first 3-D figure and the third 3-D figure have electronic documents containing similar content displayed thereon, and wherein the third 3-D figure is displayed proximately to the second 3-D figure if the second and third 3-D figures have electronic documents containing similar content displayed thereon.*

*52. The method of claim 50, wherein the third 3-D figure is displayed proximate the first 3-D figure if the first and third 3-D figures have electronic documents of a similar media type displayed thereon, and wherein the third 3-D*

*figure is displayed proximate the second 3-D figure if the second and third 3-D figures have electronic documents of a similar media type displayed thereon.*

*53. The method of claim 46, wherein generating a 3-D figure further comprises:*

*representing the first of a plurality of electronic documents as a two-dimensional thumbnail image; and*

*utilizing a modeling language to convert the two-dimensional thumbnail image into the 3-D figure.*

*54. The method of claim 53, wherein the modeling language utilized is at least one of a group consisting of VRML, 3-DML, and X3-D.*

*55. The method of claim 46, wherein the first 3-D figure is a cube having six sides.*

*56. The method of claim 45, wherein recording a multimedia representation further comprises recording navigation and audio of a creator as the creator navigates through the 3-D environment.*

*57. The method of claim 46, wherein the recorded navigation of the creator visually indicates a path taken by the creator.*

*58. The method of claim 57, wherein the multimedia representation can be played back in a plurality of playback modes including*

*a passive mode in which navigation by a user through the 3-D environment is restricted to the path taken by the creator, and*

*an active mode in which the user is able to freely navigate through the 3-D environment.*

*59. The method of claim 56, wherein the recorded audio of the creator is segmented into a plurality of audio segments and each of the plurality of audio segments is correlated to one of the plurality of electronic documents that is nearest the location of the creator at a moment in time when the audio was recorded.*

*60. A method, comprising:*

*generating a plurality of three-dimensional (3-D) objects;*

*superimposing upon the 3-D objects a plurality of electronic documents;*

*generating a 3-D environment within which the plurality of 3-D objects are to be displayed;*

*displaying the plurality of 3-D objects within the 3-D environment according to a placement scheme; and*

*playing a previously recorded multimedia representation associated with at least a portion of the electronic documents superimposed on the 3-D objects when the 3-D objects are displayed according to the placement scheme, wherein playback can occur in one or more modes.*

*61. The method of claim 60, wherein at least one 3-D object approximates the shape of at least one of a cube, a sphere, a cylinder, and a rectangular prism.*

*62. The method of claim 60, wherein the placement scheme orders a first 3-D object and corresponding electronic document and a second 3-D object and corresponding electronic document according to content.*

*63. The method of claim 60, wherein the placement scheme orders a first 3-D object and corresponding electronic document and a second 3-D object and corresponding electronic document according to media type.*

*64. The method of claim 60, wherein the placement scheme orders a first 3-D object and corresponding electronic document and a second 3-D object and corresponding electronic document according to time of creation.*

*65. The method of claim 60, wherein the placement scheme places a first 3-D object at a predetermined distance from a second 3-D object.*

*66. The method of claim 60, wherein the 3-D environment is generated using a modeling language including at least one of VRML, 3-DML, and X3-D.*

*67. A machine-readable medium having executable code to cause a machine to perform a method, the method comprising:*

*generating a multidimensional representation of a plurality of electronic documents in a three-dimensional (3-D) environment;*

*recording a multimedia representation in which the electronic documents are presented according to a predetermined placement scheme within the 3-D environment; and*

*storing the multimedia representation for playback according to the predetermined placement scheme within the 3-D environment.*

*68. The machine-readable medium of claim 67, wherein generating a multidimensional representation of a plurality of electronic documents comprises:*

*generating a first 3-D figure upon which a first of the plurality of electronic documents is superimposed; and*

*displaying the first 3-D figure within the 3-D environment.*

*69. The machine-readable medium of claim 68, wherein the method further comprises:*

*generating a second 3-D figure upon which a second of the plurality of electronic documents is superimposed; and*

*displaying the second 3-D figure within the 3-D environment.*

*70. The machine-readable medium of claim 69, wherein the first and second 3-D figures are displayed within the 3-D environment in an order representing their respective times of creation.*

*71. The machine-readable medium of claim 69, wherein the first and second 3-D figures are displayed within the 3-D environment at a predetermined distance from each other.*

*72. The machine-readable medium of claim 69, wherein the method further comprises:*

*generating a third 3-D figure upon which a third of the plurality of electronic documents is superimposed; and*

*displaying the third 3-D figure within the 3-D environment.*

*73. The machine-readable medium of claim 72, wherein the third 3-D figure is displayed proximately to the first 3-D figure if the first 3-D figure and the third 3-D figure have electronic documents containing similar content displayed thereon, and wherein the third 3-D figure is displayed proximately to the second 3-D figure if the second and third 3-D figures have electronic documents containing similar content displayed thereon.*

*74. The machine-readable medium of claim 72, wherein the third 3-D figure is displayed proximate the first 3-D figure if the first and third 3-D figures have electronic documents of a similar media type displayed thereon, and wherein the third 3-D figure is displayed proximate the second 3-D figure if the second and third 3-D figures have electronic documents of a similar media type displayed thereon.*

*75. The machine-readable medium of claim 68, wherein generating a 3-D figure further comprises:*

*representing the first of a plurality of electronic documents as a two-dimensional thumbnail image; and*

*utilizing a modeling language to convert the two-dimensional thumbnail image into the 3-D figure.*

*76. The machine-readable medium of claim 75, wherein the modeling language utilized is at least one of VRML, 3-DML, and X3-D.*

*77. The machine-readable medium of claim 68, wherein the first 3-D figure is a cube having six sides.*

*78. The machine-readable medium of claim 67, wherein recording a multimedia representation further comprises recording navigation and audio of a creator as the creator navigates through the 3-D environment.*

*79. The machine-readable medium of claim 68, wherein the recorded navigation of the creator visually indicates a path taken by the creator in the 3-D environment.*

*80. The machine-readable medium of claim 79, wherein the multimedia representation can be played back in a plurality of playback modes including*

*a passive mode in which navigation by a user through the 3-D environment is restricted to the path taken by the creator, and*

*an active mode in which the user is able to freely navigate through the 3-D environment.*

*81. The machine-readable medium of claim 78, wherein the recorded audio of the creator is segmented into a plurality of audio segments and each of the plurality of audio segments is correlated to one of the plurality of electronic documents that is nearest the location of the creator at a moment in time when the audio was recorded.*

*82. A data processing system, comprising:*

*a processor; and*

*a memory coupled to the processor and having instructions stored therein, wherein the instructions, when executed from the memory, cause the processor to*

*generate a multidimensional representation of a plurality of electronic documents in a three-dimensional (3-D) environment,*

*record a multimedia representation in which the electronic documents are presented according to a predetermined placement scheme within the 3-D environment, and*

*store the multimedia representation for playback according to the predetermined placement scheme within the 3-D environment.*

*83. An apparatus, comprising:*

*means for generating a multidimensional representation of a plurality of electronic documents in a three-dimensional (3-D) environment;*

*means for recording a multimedia representation in which the electronic documents are presented according to a predetermined placement scheme within the 3-D environment; and*

*means for storing the multimedia representation for playback according to the predetermined placement scheme within the 3-D environment.*

*84. A machine-readable medium having executable code to cause a machine to perform a method, the method comprising:*

*generating a plurality of three-dimensional (3-D) objects;*

*superimposing upon the 3-D objects a plurality of electronic documents;*

*generating a 3-D environment within which the plurality of 3-D objects are to be displayed;*

*displaying the plurality of 3-D objects within the 3-D environment according to a placement scheme; and*

*playing a previously recorded multimedia representation associated with at least a portion of the electronic documents superimposed on the 3-D objects when the 3-D objects are displayed according to the placement scheme, wherein playback can occur in one or more modes.*

*85. The machine-readable medium of claim 84, wherein at least one 3-D object approximates the shape of at least one of a cube, a sphere, a cylinder, and a rectangular prism.*

*86. The machine-readable medium of claim 84, wherein the placement scheme orders a first 3-D object and corresponding electronic document and a second 3-D object and corresponding electronic document according to content.*

*87. The machine-readable medium of claim 84, wherein the placement scheme orders a first 3-D object and corresponding electronic document and a second 3-D object and corresponding electronic document according to media type.*

*88. The machine-readable medium of claim 84, wherein the placement scheme orders a first 3-D object and corresponding electronic document and a second 3-D object and corresponding electronic document according to time of creation.*

*89. The machine-readable medium of claim 84, wherein the placement scheme places a first 3-D object at a predetermined distance from a second 3-D object.*

*90. The machine-readable medium of claim 84, wherein the 3-D environment is generated using a modeling language including at least one of VMRL, 3-DML, and X3-D.*

*91. A data processing system, comprising:*

*a processor; and*

*a memory coupled to the processor and having instructions stored therein, wherein the instructions, when executed from the memory, cause the processor to*

*generate a plurality of three-dimensional (3-D) objects,*

*superimpose upon the 3-D objects a plurality of electronic documents,*

*generate a 3-D environment within which the plurality of 3-D objects are to be displayed,*

*display the plurality of 3-D objects within the 3-D environment according to a placement scheme, and*

*play a previously recorded multimedia representation associated with at least a portion of the electronic documents superimposed on the 3-D objects when the 3-D objects are displayed according to the placement scheme, wherein playback can occur in one or more modes.*

*92. An apparatus, comprising:*

*means for generating a plurality of three-dimensional (3-D) objects;*

*means for superimposing upon the 3-D objects a plurality of electronic documents;*

*means for generating a 3-D environment within which the plurality of 3-D objects are to be displayed,*

*means for displaying the plurality of 3-D objects within the 3-D environment according to a placement scheme; and*

*means for playing a previously recorded multimedia representation associated with at least a portion of the electronic documents superimposed on the 3-D objects when the 3-D objects are displayed according to the placement scheme, wherein playback can occur in one or more modes.*

*93. A method, comprising:*

*generating a plurality of 3-D objects for placement according to a predetermined placement scheme in a 3-D environment, at least one of the 3-D objects having at least one electronic document superimposed thereon; and*

*storing the generated 3-D objects for playback subsequently according to the predetermined placement scheme within the 3-D environment.*

*94. The method of claim 93, wherein the at least one electronic document comprises a digital photography.*

*95. The method of claim 93, wherein the at least one electronic document comprises an image.*

*96. The method of claim 93, further comprising associating an image with the at least one electronic document.*

*97. The method of claim 96, wherein the image comprises a digital photograph.*

*98. The method of claim 96, further comprising associating an audio clip with the at least one electronic document.*

*99. The method of claim 98, wherein the audio clip comprises a variable length narration.*

*100. The method of claim 96, further comprising associating a video clip with the at least one electronic document.*

*101. The method of claim 93, further comprising generating the plurality of 3-D objects by dragging and dropping the at least one electronic document on the at least one 3-D object.*

*102. The method of claim 93, further comprising navigating to one or more of the 3-D objects within the 3-D environment in response to an input received from a user.*

*103. The method of claim 101, wherein navigating to one or more of the 3-D objects follows a path through the 3-D environment based on the predetermined placement scheme of the 3-D objects.*

*104. The method of claim 101, wherein navigating to one or more of the 3-D objects is performed according to user input.*

*105. The method of claim 103, further comprising rearranging configuration of at least one 3-D object while navigating within the 3-D environment.*

*106. The method of claim 105, wherein the predetermined placement scheme is based on a navigation of the 3-D objects within the 3-D environment.*

*107. The method of claim 106, further comprising displaying a representation of the navigation in a separate display area while navigating the one or more 3-D objects are being navigated.*

*108. The method of claim 107, wherein the navigation and the one or more 3-D objects being navigated are displayed in different resolutions.*

*109. The method of claim 101, wherein navigating to the plurality of 3-D objects comprises displaying one or more of the 3-D objects within the 3-D environment at a first resolution at one time and gradually transitioning to a second resolution a second time later than the first time.*

*110. The method of claim 109, wherein the second resolution is higher than the first resolution when approaching the one or more of the 3-D objects during navigation.*

*111. The method of claim 109, wherein at least one of the 3-D objects is displayed larger when in the second resolution than in the first resolution when approaching the one or more of the 3-D objects.*

*112. The method of claim 109, wherein the second resolution is lower than the first resolution when moving away from the at least a portion of the 3-D objects.*

*113. The method of claim 109, wherein at least one of the 3-D objects in the second resolution is displayed smaller than in the first resolution when navigating away from the at least a portion of the 3-D objects.*

*114. The method of claim 109, wherein navigating to the one or more of the 3-D objects comprises removing at least one 3-D object from display while navigating when the at least one 3-D object is out side of a predetermined proximity of a location in the 3-D environment being displayed.*

*115. The method of claim 102, wherein navigating to the one or more 3-D objects comprises playing multimedia content associated with the at least one electronic document when navigating within a predetermined proximity of the respective 3-D object.*

*116. The method of claim 115, wherein the multimedia content comprises an audio clip.*

*117. The method of claim 116, further comprising:*

*increasing volume of the audio clip when approaching the predetermined proximity of the respective 3-D object; and*

*decreasing the volume of the audio clip when moving away from the predetermined proximity of the respective 3-D object.*

*118. The method of claim 115, further comprising locating the audio clip based on using stereo effects corresponding to a position of at least one 3-D object within the 3-D environment.*

*119. The method of claim 115, wherein the multimedia content comprises a video clip.*

*120. The method of claim 119, further comprising:*

*increasing resolution of the video clip when approaching the predetermined proximity of the respective 3-D object; and*

*decreasing the resolution of the video clip when navigating away from the predetermined proximity of the respective 3-D object.*

*121. The method of claim 115, wherein the multimedia content includes a description of at least a portion of content of the electronic document.*

*122. The method of claim 102, further comprising displaying an indicator indicating progress through the 3-D environment while navigating within the 3-D environment.*

*123. The method of claim 112, wherein the indicator comprises a first user adjustable gauge indicating a current progress of the navigation.*

*124. The method of claim 123, wherein the first user adjustable gauge indicates progress of a navigation according to a path created by a creator of the recorded 3-D objects, and further comprises a second user adjustable gauge to indicate progress of a current navigation according to a user defined path other than the path created by the creator.*

*125. The method of claim 124, wherein the first and second user adjustable gauges are displayed in different resolutions.*

*126. The method of claim 125, wherein the first and second user adjustable gauges are displayed in different colors.*

*127. The method of claim 123, further comprising in response to an adjustment via the first user adjustable gauge, displaying one or more of the 3-D objects associated with the adjusted position of the first user adjustable gauge within the 3-D environment.*

*128. The method of claim 93, wherein recording the plurality of 3-D objects comprises recording a path within the 3-D environment generated by virtual movements of a user while navigating within the 3-D environment containing the 3-D objects.*

*129. The method of claim 128, wherein recording the plurality of 3-D objects further comprises recording an audio clip of an individual substantially concurrently with recording the path, and wherein the audio clip is associated at least one 3-D object.*

*130. The method of claim 93, further comprising navigating through the 3-D environment while recording the plurality of 3-D objects, and recording positions within the 3-D environment while navigating through the 3-D environment.*

*131. The method of claim 93, further comprising displaying at least one electronic document in a separate display area overlaying the 3-D environment, the displayed elec-*

*tronic document having a higher resolution than the corresponding electronic document superimposed on a 3-D object.*

*132. The method of claim 93, further comprising displaying a source of at least one electronic document in a separate display area overlaying the 3-D environment.*

*133. A machine-readable medium having executable code to cause a machine to perform a method, the method comprising:*

*generating a plurality of 3-D objects for placement according to a predetermined placement scheme in a 3-D environment, at least one of the 3-D objects having at least one electronic document superimposed thereon; and*

*storing the generated 3-D objects for playback subsequently according to the predetermined placement scheme within the 3-D environment.*

*134. A data processing system, comprising:*

*a processor; and*

*a memory coupled to the processor and having instructions stored therein, wherein the instructions, when executed from the memory, cause the processor to*

*generate a plurality of 3-D objects for placement according to a predetermined placement scheme in a 3-D environment, at least one of the 3-D objects having at least one electronic document superimposed thereon, and*

*store the generated 3-D objects for playback subsequently according to the predetermined placement scheme within the 3-D environment.*

*135. An apparatus, comprising:*

*means for generating a plurality of 3-D objects for placement according to a predetermined placement scheme in a 3-D environment, at least one of the 3-D objects having at least one electronic document superimposed thereon; and*

*means for storing the generated 3-D objects for playback subsequently according to the predetermined placement scheme within the 3-D environment.*

*136. A method, comprising:*

*in response to an input received from a user, accessing a plurality of three-dimensional (3-D) objects, at least one of the 3-D objects having at least one electronic document superimposed thereon, the plurality of 3-D objects being previously placed in a 3-D environment according to a predetermined placement scheme; and*

*activating a presentation of the plurality of 3-D objects in the 3-D environment according to the predetermined placement scheme.*

*137. The method of claim 136, wherein the at least one electronic document comprises a digital photography.*

*138. The method of claim 136, wherein the at least one electronic document comprises an image.*

*139. The method of claim 136, further comprising associating an image with the least one electronic document.*

*140. The method of claim 139, wherein the image comprises a digital photograph.*

*141. The method of claim 139, further comprising associating an audio clip with the least one electronic document.*

*142. The method of claim 139, further comprising associating a video clip with the least one electronic document.*

*143. The method of claim 136, wherein the plurality of 3-D objects was recorded by dragging and dropping the at least one electronic document on the at least one 3-D object.*

*144. The method of claim 136, further comprising navigating to one or more of the 3-D objects within the 3-D environment in response to an input received from a user.*

*145. The method of claim 144, wherein navigating one or more 3-D objects is performed according to the predetermined placement scheme of the 3-D objects within the 3-D environment.*

*146. The method of claim 144, wherein navigating one or more 3-D objects is performed according to a manner specified by the user.*

*147. The method of claim 144, wherein navigating one or more 3-D objects comprises displaying one or more 3-D objects through a gradual transition from a first resolution to a second resolution within the 3-D environment.*

*148. The method of claim 147, wherein the second resolution is higher than the first resolution when approaching the one or more 3-D objects.*

*149. The method of claim 147, wherein at least one of the 3-D objects is displayed larger when in the second resolution than in the first resolution when approaching the one or more 3-D objects.*

*150. The method of claim 147, wherein the second resolution is lower than the first resolution when moving away from the one or more 3-D objects.*

*151. The method of claim 147, wherein at least one of the 3-D objects is displayed smaller when in the second resolution than in the first resolution when moving away from the one or more 3-D objects.*

*152. The method of claim 147, wherein navigating the one or more 3-D objects comprises removing at least one 3-D object from display when a point in time of the navigation is out side of a predetermined proximity of the respective 3-D object.*

*153. The method of claim 144, wherein navigating the plurality of 3-D objects comprises playing a multimedia content associated with the at least one electronic document when a point in time of the navigation is within a predetermined proximity of the respective 3-D object.*

*154. The method of claim 153, wherein the multimedia content comprises an audio clip.*

*155. The method of claim 154, further comprising:*

*increasing a volume of the audio clip when approaching a proximity of the respective 3-D object; and*

*decreasing the volume of the audio clip when moving away from the proximity of the respective 3-D object.*

*156. The method of claim 153, wherein the multimedia content comprises a video clip.*

*157. The method of claim 156, further comprising:*

*increasing a resolution of the video clip when approaching a proximity of the respective 3-D object; and*

*decreasing the resolution of the video clip when moving away from the proximity of the respective 3-D object.*

*158. The method of claim 153, wherein the multimedia content describes at least a portion of content of the electronic document.*

*159. The method of claim 144, further comprising displaying an indicator indicating a progress of the navigation while the navigation is being performed within the 3-D environment.*

*160. The method of claim 159, wherein the indicator comprises a first user adjustable gauge indicating a current progress of the navigation.*

*161. The method of claim 160, further comprising in response to a user adjustment via the user adjustable gauge, displaying one or more of the 3-D objects associated with the adjusted position of the user adjustable gauge within the 3-D environment.*

*162. The method of claim 141, wherein the audio clip comprises a variable length narration.*

*163. The method of claim 160, wherein the first user adjustable gauge indicates progress of a navigation accord-*

*ing to a path created by a creator of the recorded 3-D objects, and further comprises a second user adjustable gauge to indicate progress of a current navigation according to a user defined path other than the path created by the creator.*

*164. The method of claim 163, wherein the first and second user adjustable gauges are displayed in different resolutions.*

*165. The method of claim 164, wherein the first and second user adjustable gauges are displayed in different colors.*

*166. The method of claim 136, wherein each of the plurality of 3-D objects was placed previously according to a path generated by virtual movements within the 3-D environment while navigating within the 3-D environment containing the 3-D objects.*

*167. The method of claim 166, wherein the representation of the plurality of 3-D objects includes an audio clip associated with at least one 3-D object recorded substantially concurrently with recording the plurality of 3-D objects.*

*168. The method of claim 136, further comprising navigating to the 3-D objects while recording positions within the 3-D environment as a part of recording the plurality of 3-D objects.*

*169. The method of claim 136, further comprising displaying at least one electronic document in a separate display area overlaying the 3-D environment, the displayed electronic document having a higher resolution than the corresponding electronic document superimposed on a 3-D object.*

*170. The method of claim 136, further comprising displaying a source of at least one electronic document in a separate display area overlaying the 3-D environment.*

*171. The method of claim 146, wherein the predetermined placement scheme is created based on a path navigated by a creator of the 3-D objects within the 3-D environment.*

*172. The method of claim 171, further comprising displaying the path navigated by the creator in a separate display area while navigating the one or more 3-D objects is performed according to a path specified by the user.*

*173. The method of claim 172, wherein the paths of the creator and the user are displayed in different resolutions.*

*174. The method of claim 154, further comprising locating the audio clip based on using stereo effects corresponding to a position of at least one 3-D object within the 3-D environment.*

*175. The method of claim 146, further comprising rearranging configuration of at least one 3-D object while navigating within the 3-D environment.*

*176. A machine-readable medium having executable code to cause a machine to perform a method, the method comprising:*

*in response to an input received from a user, accessing a plurality of three-dimensional (3-D) objects, at least one of the 3-D objects having at least one electronic document superimposed thereon, the plurality of 3-D objects being previously placed in a 3-D environment according to a predetermined placement scheme; and*

*activating a presentation of the plurality of 3-D objects in the 3-D environment according to the predetermined placement scheme.*

*177. A data processing system, comprising:*

*a processor; and*

*a memory coupled to the processor and having instructions stored therein, wherein the instructions, when executed from the memory, cause the processor to*

*in response to an input received from a user, access a plurality of three-dimensional (3-D) objects, at least one of the 3-D objects having at least one electronic document superimposed thereon, the plurality of 3-D objects being previously placed in a 3-D environment according to a predetermined placement scheme, and*

*activate a presentation of the plurality of 3-D objects in the 3-D environment according to the predetermined placement scheme.*

*178. An apparatus, comprising:*

*in response to an input received from a user, means for accessing a plurality of three-dimensional (3-D) objects, at least one of the 3-D objects having at least one electronic document superimposed thereon, the plurality of 3-D objects being previously placed in a 3-D environment according to a predetermined placement scheme; and*

*means for activating a presentation of the plurality of 3-D objects in the 3-D environment according to the predetermined placement scheme.*

*179. A method, comprising:*

*generating a plurality of three-dimensional (3-D) objects, at least one 3-D object having at least one digital photograph superimposed thereon;*

*arranging the plurality of 3-D objects according to a placement scheme specified by a user, the arranged 3-D objects forming a 3-D environment; and*

*recording a 3-D path based on locations of the plurality of 3-D objects arranged according to the placement scheme within the 3-D environment, wherein the plurality of 3-D objects can be played back by navigating the recorded 3-D path subsequently.*

*180. A method, comprising:*

*reconstructing a 3-D path previously recorded based on locations of a plurality of 3-D objects arranged according to a placement scheme to form a 3-D environment, at least one 3-D object having at least one digital photograph superimposed thereon; and*

*in response to an input from a user, navigating the reconstructed 3-D path by presenting at least a portion of the 3-D objects according to the placement scheme within the 3-D environment.*

*181. A method, comprising:*

*in response to an input received from a user, accessing a plurality of three-dimensional (3-D) objects previously stored in a 3-D environment, at least one of the 3-D objects having at least one electronic document superimposed thereon; and*

*activating a presentation of the plurality of 3-D objects in the 3-D environment, including displaying a progress gauge indicating current progress of the presentation and displaying a graphical representation identifying the creator within proximity of the progress gauge.*

*182. A method, comprising:*

*in response to an input received from a user, accessing a plurality of three-dimensional (3-D) objects, at least one of the 3-D objects having at least one electronic document superimposed thereon, the plurality of 3-D objects being previously recorded by a creator in a 3-D environment; and*

*activating a presentation of the plurality of 3-D objects in the 3-D environment, including displaying a first progress gauge indicating a progress of the presentation and displaying a second progress gauge indicating*

*a current progress of the presentation according to a manner decided by the user, wherein the first and second progress gauges are displayed in different resolutions.*

*183. A method, comprising:*

*generating a plurality of three-dimensional (3-D) objects, at least one of the 3-D objects having at least one electronic document superimposed thereon; and*

*storing the one or more 3-D objects for playback subsequently according to a stored path through which a user navigates one or more of the plurality of 3-D objects within the 3-D environment.*

*184. A machine-readable medium having executable code to cause a machine to perform a method, the method comprising:*

*generating a plurality of three-dimensional (3-D) objects, at least one of the 3-D objects having at least one electronic document superimposed thereon; and*

*storing the one or more 3-D objects for playback subsequently according to the a path through which a user navigates one or more of the plurality of 3-D objects within the 3-D environment.*

*185. A data processing system, comprising:*

*a processor; and*

*a memory coupled to the processor and having instructions stored therein, wherein the instructions, when executed from the memory, cause the processor to*

*generate a plurality of three-dimensional (3-D) objects, at least one of the 3-D objects having at least one electronic document superimposed thereon, and*

*store the one or more 3-D objects for playback subsequently according to a stored path through which a user navigates one or more of the plurality of 3-D objects within the 3-D environment.*

*186. An apparatus, comprising:*

*means for generating a plurality of three-dimensional (3-D) objects, at least one of the 3-D objects having at least one electronic document superimposed thereon; and*

*means for storing the one or more 3-D objects for playback subsequently according to the stored path through which a user navigates one or more of the plurality of 3-D objects within the 3-D environment.*

*187. A method, comprising:*

*recording virtual movements of a user while navigating one or more of a plurality of 3-D objects within the 3-D environment, at least one of the 3-D objects having at least one electronic document superimposed thereon; and*

*storing the one or more 3-D objects for playback according to the recorded virtual movements of the user within the 3-D environment.*

*188. The method of claim 187, wherein the at least one electronic document comprises a digital photography.*

*189. The method of claim 187, wherein the at least one electronic document comprises an image.*

*190. A method, comprising:*

*in response to an input received from a user, accessing a plurality of three-dimensional (3-D) objects, at least one of the 3-D objects having at least one electronic document superimposed thereon, the plurality of 3-D objects being previously recorded for playback in a 3-D environment according to a first navigation specified by a first user; and*

*activating a presentation of the plurality of 3-D objects in the 3-D environment to which the plurality of 3-D objects are navigated according to a second navigation while displaying the first navigation.*

*191. A method, comprising:*

*generating a first three-dimensional (3-D) figure within a 3-D environment upon which a first electronic document is superimposed;*

*generating a second three-dimensional (3-D) figure within the 3-D environment upon which a second electronic document is superimposed;*

*generating the first and second 3-D figures within the 3-D environment at a predetermined distance from each other; and*

*storing the generated first and second 3-D figures for playback subsequently in one or more playback modes.*

*192. A machine-readable medium having executable code to cause a machine to perform a method, the method comprising:*

*generating a first three-dimensional (3-D) figure within a 3-D environment upon which a first electronic document is superimposed;*

*generating a second three-dimensional (3-D) figure within the 3-D environment upon which a second electronic document is superimposed;*

*generating the first and second 3-D figures within the 3-D environment at a predetermined distance from each other; and*

*storing the generated first and second 3-D figures for playback subsequently in one or more playback modes.*

*193. A data processing system, comprising:*

*a processor; and*

*a memory coupled to the processor and having instructions stored therein, wherein the instructions, when executed from the memory, cause the processor to*

*generate a first three-dimensional (3-D) figure within a 3-D environment upon which a first electronic document is superimposed,*

*generate a second three-dimensional (3-D) figure within the 3-D environment upon which a second electronic document is superimposed,*

*generate the first and second 3-D figures within the 3-D environment at a predetermined distance from each other, and*

*store the generated first and second 3-D figures for playback subsequently in one or more playback modes.*

*194. An apparatus, comprising:*

*means for generating a first three-dimensional (3-D) figure within a 3-D environment upon which a first electronic document is superimposed;*

*means for generating a second three-dimensional (3-D) figure within the 3-D environment upon which a second electronic document is superimposed;*

*means for generating the first and second 3-D figures within the 3-D environment at a predetermined distance from each other; and*

*means for storing the generated first and second 3-D figures for playback subsequently in one or more playback modes.*

*195. A method, comprising:*

*generating a first three-dimensional (3-D) figure within a 3-D environment upon which a first electronic document is superimposed;*

*generating a second three-dimensional (3-D) figure within the 3-D environment upon which a second electronic document is superimposed;*

*displaying the first and second 3-D figures within the 3-D environment according to a user configurable configuration, wherein at least one of the first and second 3-D figures includes a cube having six sides;*

*recording the displayed first and second 3-D figures within the 3-D environment; and*

*storing the recorded first and second 3-D figures for playback subsequently in one or more playback modes.*

*196. A method, comprising:*

*storing an electronic document and one or more statements, the one or more statements associated with a predetermined area of the electronic document; and*

*displaying the electronic document and a representation of the one or more statements graphically linking with the predetermined area of the electronic document, the representation of the one or more statements identifying a creator of the one or more statements.*

*197. The method of claim 196, wherein the one or more statements comprise one or more audio clips.*

*198. The method of claim 196, wherein the one or more statements comprise one or more video clips.*

*199. The method of claim 196, wherein the representation of the one or more statements is displayed in a color associated with the creator.*

*200. The method of claim 196, wherein the representation of the one or more statements includes a graphical representation identifying the creator.*

*201. The method of claim 196, wherein the representation of the one or more statements includes a reference marker referencing the predetermined area of the electronic document.*

*202. The method of claim 196, wherein the one or more statements are stored and displayed, and wherein an adjacency relationship between the one or more statements is displayed.*

*203. The method of claim 196, wherein one or more files associated with the electronic document and the one or more statements are stored in a form capable of being transmitted via an email to another user.*

*204. The method of claim 196, wherein the electronic document and the one or more statements are stored separately.*

*205. The method of claim 196, wherein one or more files associated with the electronic document and the one or more statements are stored such that another user can access the one or more files through a Web interface.*

*206. The method of claim 205, wherein the access to the one or more files by another user is controlled by the creator.*

*207. The method of claim 196, wherein one or more files associated with the electronic document and the one or more statements are stored in a Web server.*

*208. The method of claim 196, wherein another user other than the creator can record another statement to be added to the electronic document and the one or more statements.*

*209. A machine-readable medium having executable code to cause a machine to perform a method, the method comprising:*

*storing an electronic document and one or more statements, the one or more statements associated with a predetermined area of the electronic document; and*

*displaying the electronic document and a representation of the one or more statements graphically linking with the predetermined area of the electronic document, the representation of the one or more statements identifying a creator of the one or more statements.*

*210. A data processing system, comprising:*

*a processor; and*

*a memory coupled to the processor and having instructions stored therein, wherein the instructions, when executed from the memory, cause the processor to*

*store an electronic document and one or more statements, the one or more statements associated with a predetermined area of the electronic document, and*

*display the electronic document and a representation of the one or more statements graphically linking with the predetermined area of the electronic document, the representation of the one or more statements identifying a creator of the one or more statements.*

*211. An apparatus, comprising:*

*means for storing an electronic document and one or more statements, the one or more statements associated with a predetermined area of the electronic document; and*

*means for displaying the electronic document and a representation of the one or more statements graphically linking with the predetermined area of the electronic document, the representation of the one or more statements identifying a creator of the one or more statements.*

*212. A method, comprising:*

*storing an electronic document and one or more statements, the one or more statements associated with a predetermined area of the electronic document; and*

*displaying the electronic document and a representation of the one or more statements, the representation of the one or more statements identifying a creator of the one or more statements, wherein the user manipulable journal is accessible by another user via a Web interface.*

*213. A machine-readable medium having executable code to cause a machine to perform a method, the method comprising:*

*storing an electronic document and one or more statements, the one or more statements associated with a predetermined area of the electronic document; and*

*displaying the electronic document and a representation of the one or more statements, the representation of the one or more statements identifying a creator of the one or more statements, wherein the user manipulable journal is accessible by another user via a Web interface.*

*214. A data processing system, comprising:*

*a processor; and*

*a memory coupled to the processor and having instructions stored therein, wherein the instructions, when executed from the memory, cause the processor to*

*store an electronic document and one or more statements, the one or more statements associated with a predetermined area of the electronic document, and*

*display the electronic document and a representation of the one or more statements, the representation of the one or more statements identifying a creator of the one or more statements, wherein the user manipulable journal is accessible by another user via a Web interface.*

*215. An apparatus, comprising:*

*means for storing an electronic document and one or more statements, the one or more statements associated with a predetermined area of the electronic document; and*

*means for displaying the electronic document and a representation of the one or more statements, the representation of the one or more statements identifying a creator of the one or more statements, wherein the user manipulable journal is accessible by another user via a Web interface.*

*216. A method, comprising:*

*storing an electronic document and one or more statements, the one or more statements associated with a predetermined area of the electronic document;*

*segmenting the electronic document and the one or more statements into a plurality of segments, at least one segment including at least one statement; and*

*selectively displaying a representation of the at least one statement within the at least one segment according to an user input.*

*217. The method of claim 215, wherein segmenting the electronic document and the one or more statements is performed based on at least one of a creator and time of creation of the one or more statements.*

*218. The method of claim 215, further comprising sending one or more files associated with the segmented electronic document and the one or more statements from a user to another user, wherein the one or more statements are generated by different users.*

* * * * *